(12) United States Patent
Rajendran et al.

(10) Patent No.: US 11,339,859 B2
(45) Date of Patent: May 24, 2022

(54) INFINITELY VARIABLE TRANSMISSION WITH UNIFORM INPUT-TO-OUTPUT RATIO THAT IS NON-DEPENDANT ON FRICTION

(71) Applicants: Raja Ramanujam Rajendran, Troy, MI (US); Prashanth Ram Rajendran, Troy, MI (US)

(72) Inventors: Raja Ramanujam Rajendran, Troy, MI (US); Prashanth Ram Rajendran, Troy, MI (US)

( * ) Notice: Subject to any disclaimer, the term of this patent is extended or adjusted under 35 U.S.C. 154(b) by 0 days.

(21) Appl. No.: 16/395,219

(22) Filed: Apr. 25, 2019

(65) Prior Publication Data

US 2019/0316662 A1    Oct. 17, 2019

Related U.S. Application Data

(63) Continuation-in-part of application No. 15/455,201, filed on Mar. 10, 2017, now Pat. No. 11,098,791.

(51) Int. Cl.
*F16H 29/20* (2006.01)
*F16H 29/00* (2006.01)
(Continued)

(52) U.S. Cl.
CPC ........... *F16H 29/20* (2013.01); *F16H 21/36* (2013.01); *F16H 29/00* (2013.01); *F16H 29/08* (2013.01);
(Continued)

(58) Field of Classification Search
CPC ........ F16H 19/043; F16H 21/36; F16H 29/00; F16H 29/02; F16H 29/04; F16H 29/06;
(Continued)

(56) References Cited

U.S. PATENT DOCUMENTS 2,036,624 A * 4/1936 Garratt .................... F16H 29/06
74/117
4,714,452 A * 12/1987 Kumm .................... F16H 55/54
474/49

(Continued)

OTHER PUBLICATIONS

Wikipedia contributors. (Mar. 15, 2014). Chain drive. In Wikipedia, The Free Encyclopedia. Retrieved 21:05, Jan. 12, 2021, from https://en.wikipedia.org/w/index.php?title=Chain_drive&oldid=599670934 (Year: 2014).*

*Primary Examiner* — Joseph Brown

(57) ABSTRACT

The present disclosure is an all gear infinitely variable transmission that is non-dependent on friction. It can be used in high torque applications, offering a steady and uniform output for a steady and uniform input. Since it allows a co-axial input and output, by using a planetary gear system the output can be made continuous from forward to reverse. It uses a "scotch-yoke" mechanism to convert rotational motion to a linear reciprocating motion. The linear distance of this reciprocating motion—"stroke" is changed by altering the crankpin location of the scotch-yoke mechanism. This reciprocating motion is converted to a rocking motion by using a "rack and pinion" and later converted to a unidirectional motion via a One-Way-Bearing. A set of non-circular gears are used to achieve a steady and uniform output. It employs a very simple mechanism to change the ratio between the input and output of the transmission.

11 Claims, 28 Drawing Sheets

(51) Int. Cl.
  *F16H 21/36* (2006.01)
  *F16H 29/08* (2006.01)
  *F16H 29/18* (2006.01)
  *F16H 29/14* (2006.01)
  *F16H 35/00* (2006.01)
  *F16H 35/02* (2006.01)
  *F16H 19/04* (2006.01)

(52) U.S. Cl.
  CPC ............ *F16H 19/043* (2013.01); *F16H 29/14* (2013.01); *F16H 29/18* (2013.01); *F16H 35/02* (2013.01); *F16H 2035/003* (2013.01)

(58) Field of Classification Search
  CPC .......... F16H 29/08; F16H 29/10; F16H 29/12; F16H 29/14; F16H 29/16; F16H 29/18; F16H 29/20; F16H 35/02; F16H 2035/003; F16H 2048/082
  USPC .................... 74/33, 76, 125.5, 831, 832, 117
  See application file for complete search history.

(56) References Cited

U.S. PATENT DOCUMENTS

| | | | | |
|---|---|---|---|---|
| 5,440,945 | A * | 8/1995 | Penn | F16H 29/08 74/117 |
| 5,603,240 | A * | 2/1997 | Klovstad | F16H 29/20 74/120 |
| 5,685,794 | A * | 11/1997 | Willmot | B62M 9/08 475/170 |
| 9,028,350 | B2 * | 5/2015 | Cho | F16H 63/065 474/47 |
| 9,347,531 | B2 * | 5/2016 | Cho | F16H 9/24 |
| 9,506,545 | B2 * | 11/2016 | Klovstad | F16H 29/04 |
| 2004/0025611 | A1 * | 2/2004 | Naude | F16H 29/00 74/125.5 |
| 2004/0220012 | A1 * | 11/2004 | Siman-tov | F16G 13/02 475/207 |
| 2005/0227797 | A1 * | 10/2005 | Jeng | F16H 55/54 474/47 |
| 2010/0199805 | A1 | 8/2010 | Downs | |

\* cited by examiner

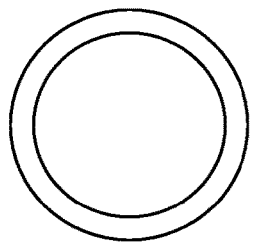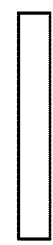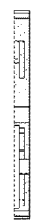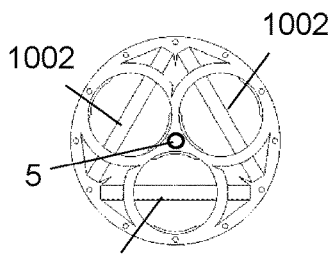
Fig. 3A  Fig. 3B  Fig. 4A  Fig. 4B
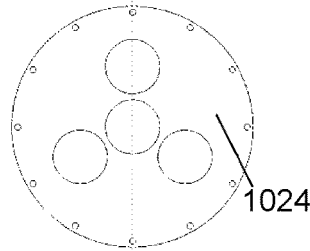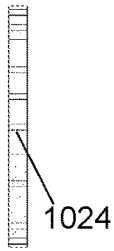
Fig. 5A  Fig. 5B
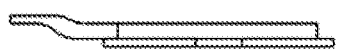
Fig. 6A
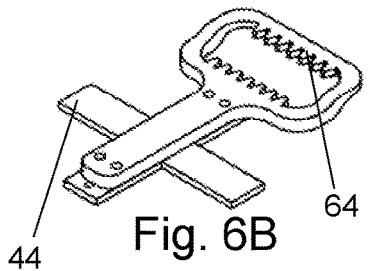
Fig. 6B
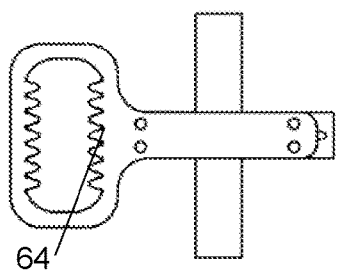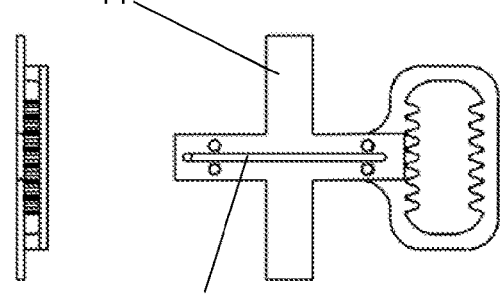
Fig. 6G  Fig. 6D  Fig. 6E  Fig. 6F
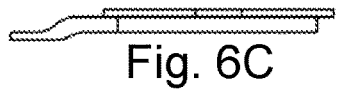
Fig. 6C

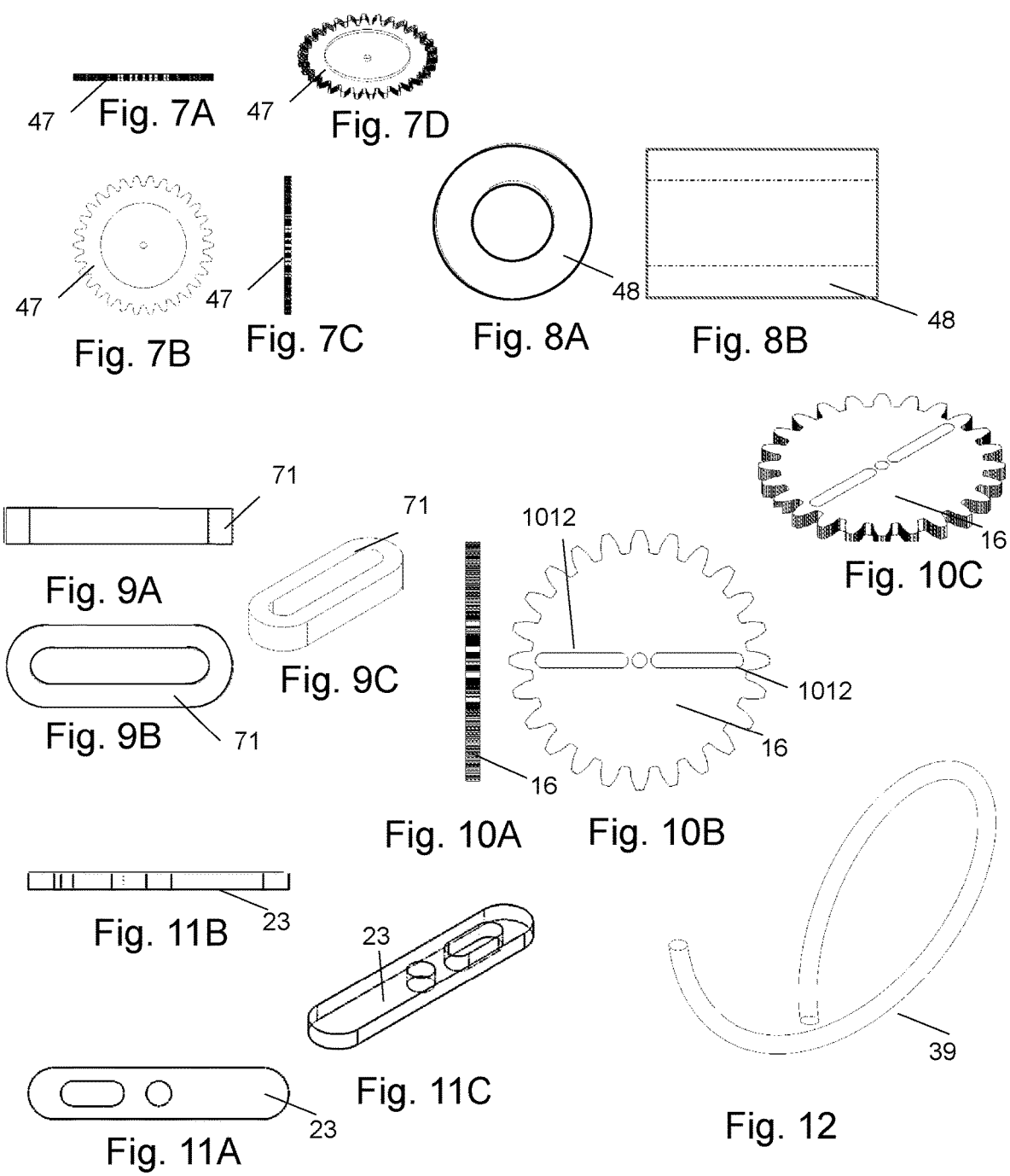

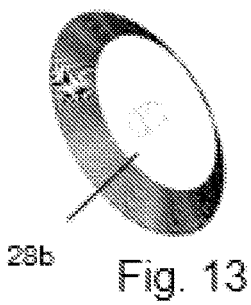
Fig. 13
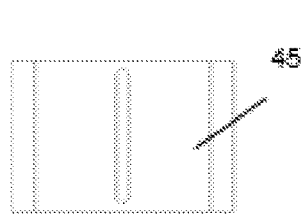
Fig. 14A
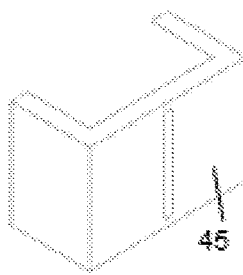
Fig. 14C
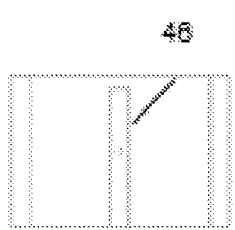
Fig. 15B
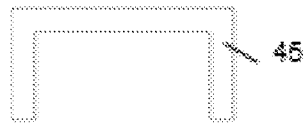
Fig. 14B
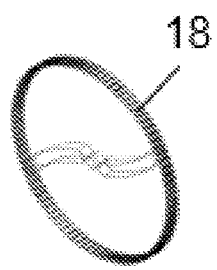
Fig. 16C
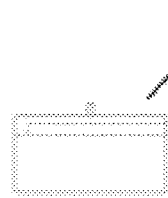
Fig. 15C
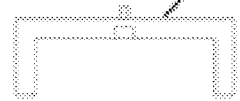
Fig. 15A
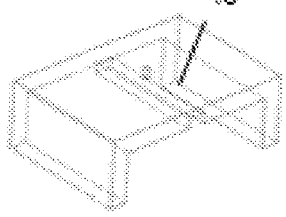
Fig. 15D
Fig. 16B
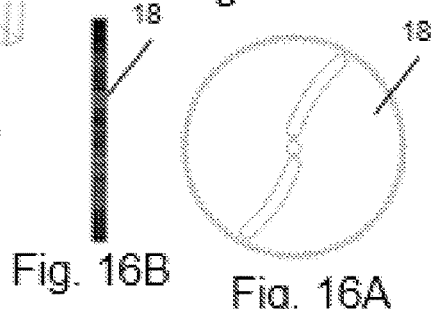
Fig. 16A
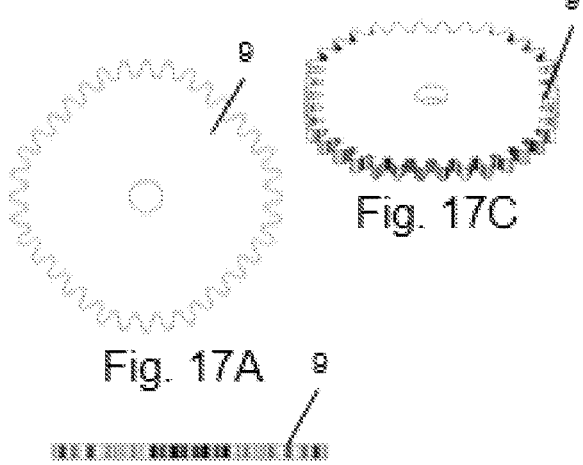
Fig. 17A
Fig. 17C
Fig. 17B
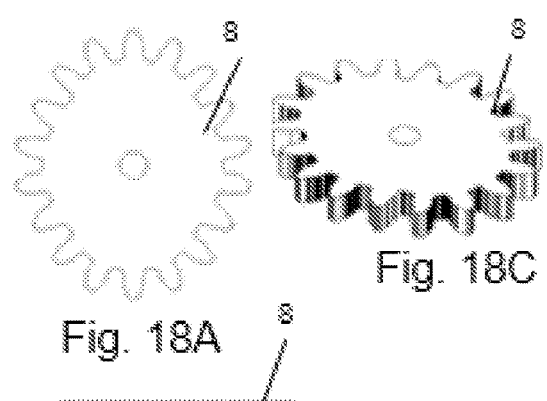
Fig. 18A
Fig. 18C
Fig. 18B

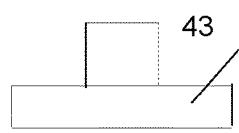
Fig. 19A
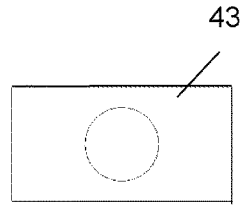
Fig. 19B
Fig. 19C
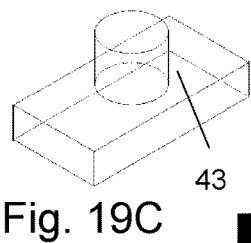
Fig. 20A
Fig. 20B
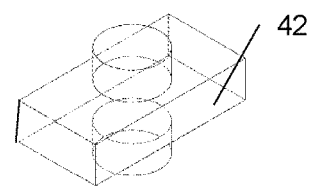
Fig. 20C
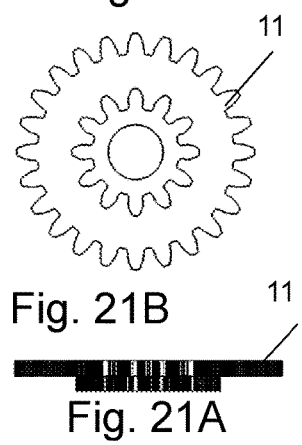
Fig. 21B
Fig. 21A
Fig. 22B
Fig. 22C
Fig. 22A
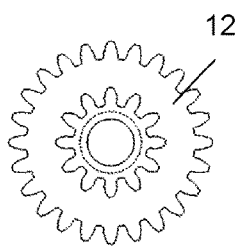
Fig. 23B
Fig. 23C
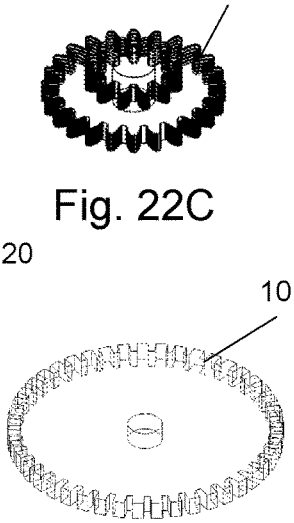
Fig. 24C
Fig. 24B
Fig. 24A

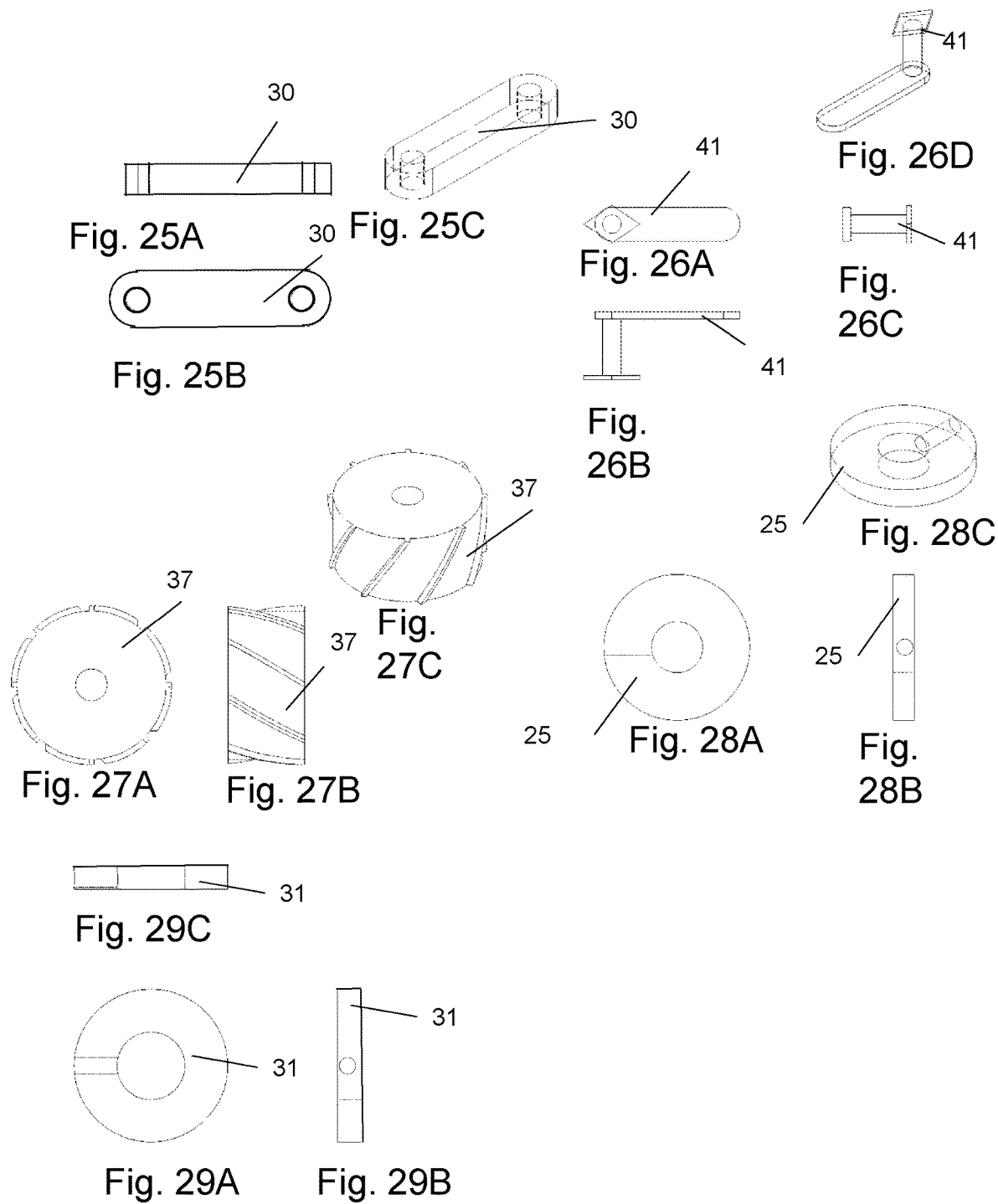

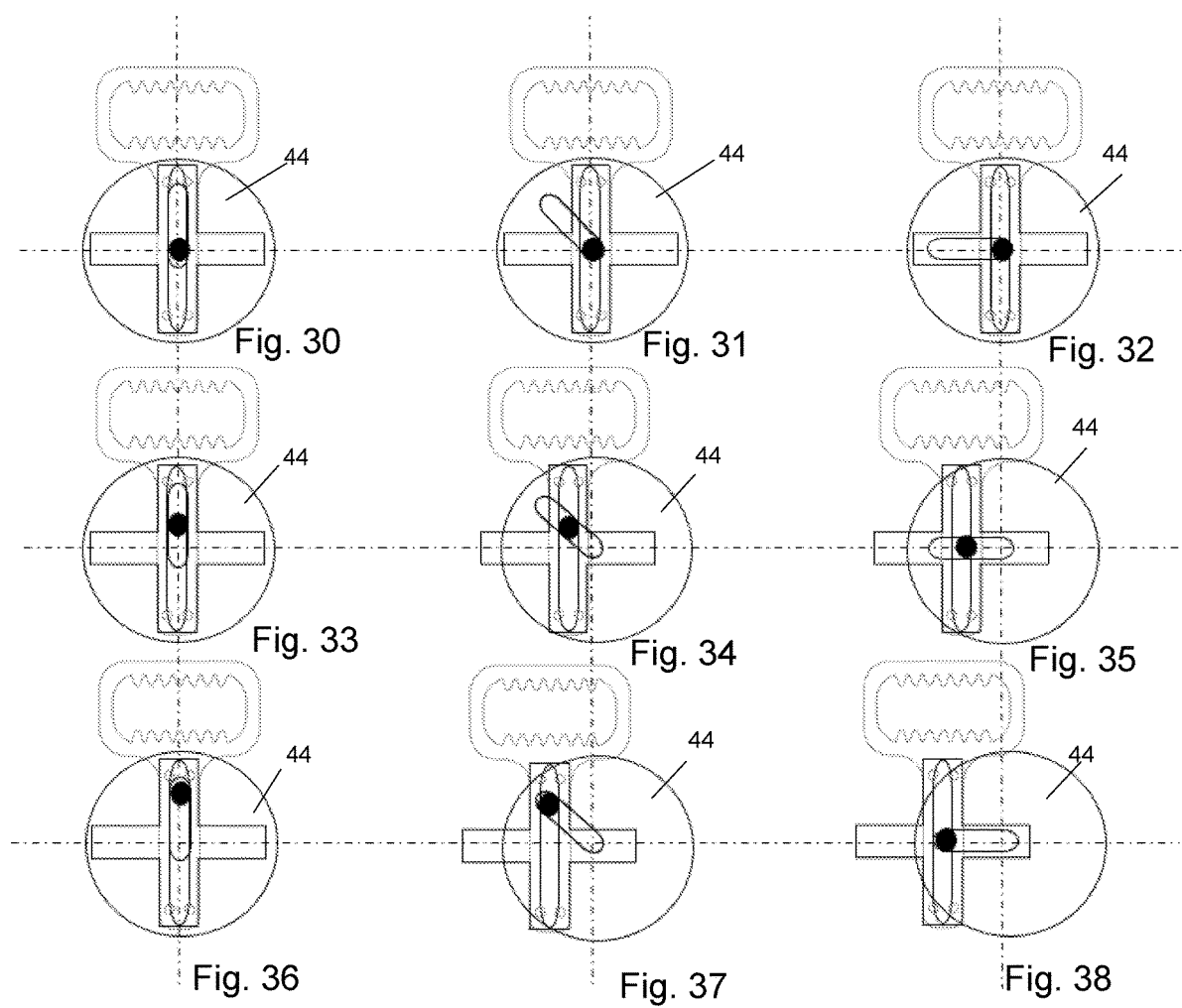

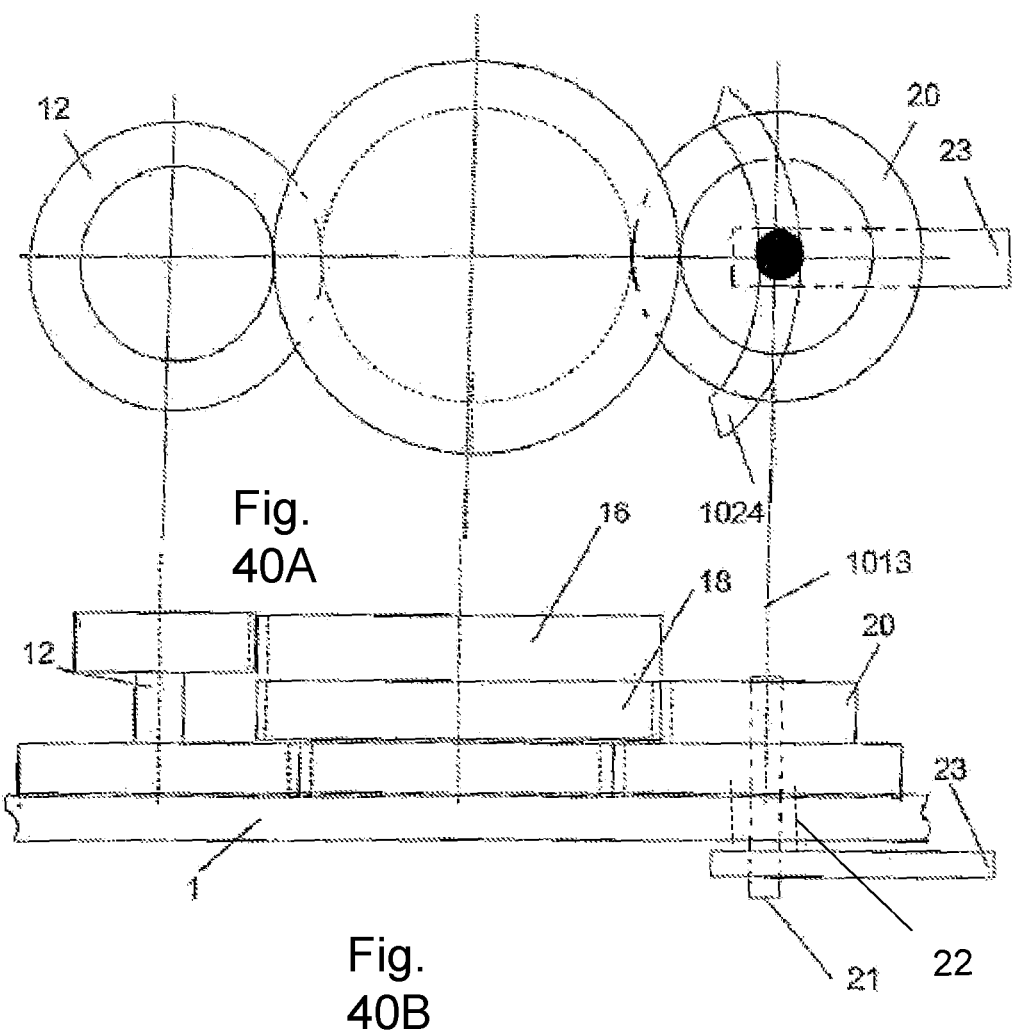

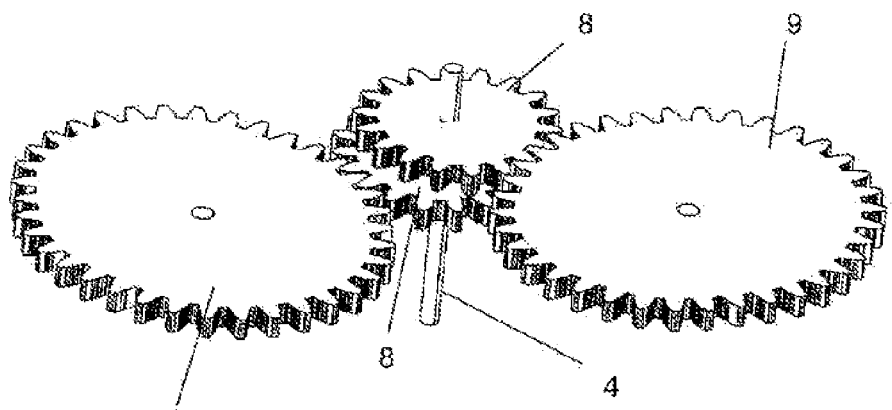
Fig. 64
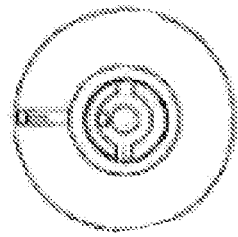
Fig. 65A
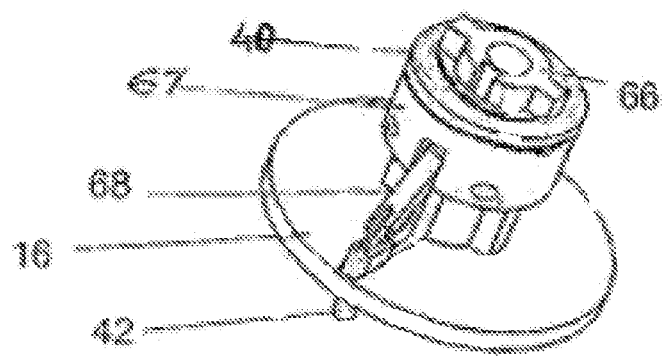
Fig. 65D
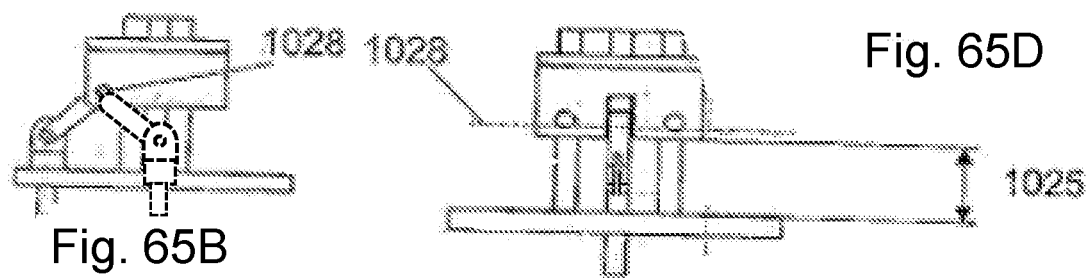
Fig. 65B
Fig. 65C
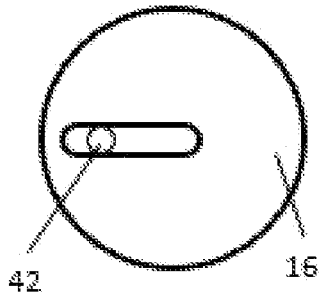
Fig. 65E

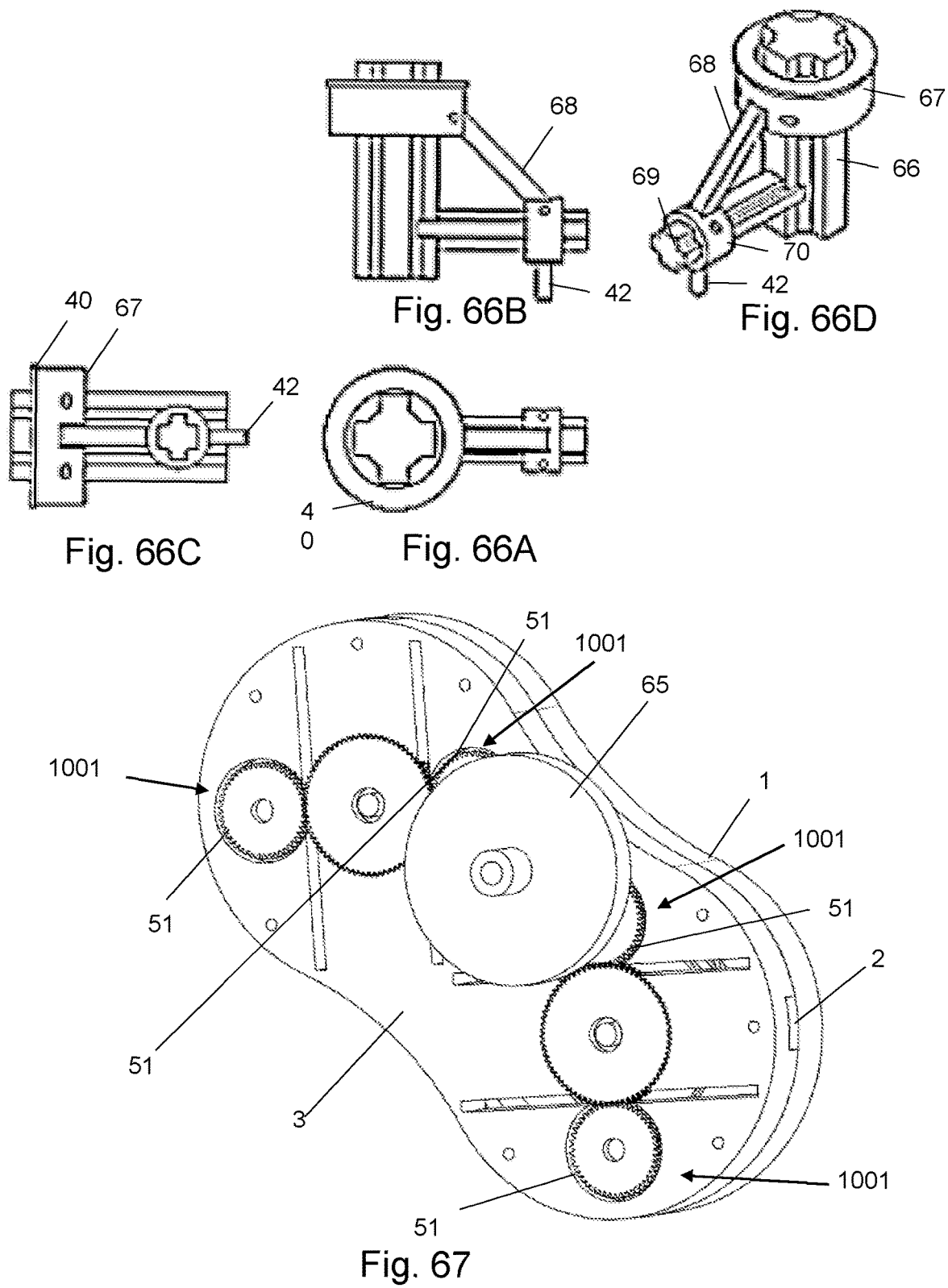

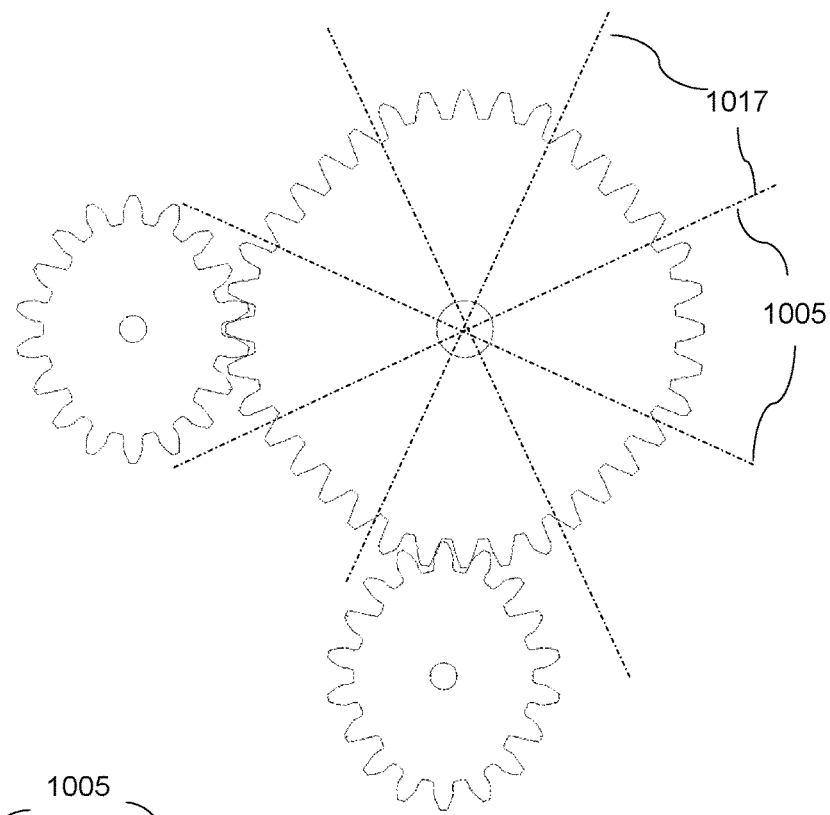
Fig. 72
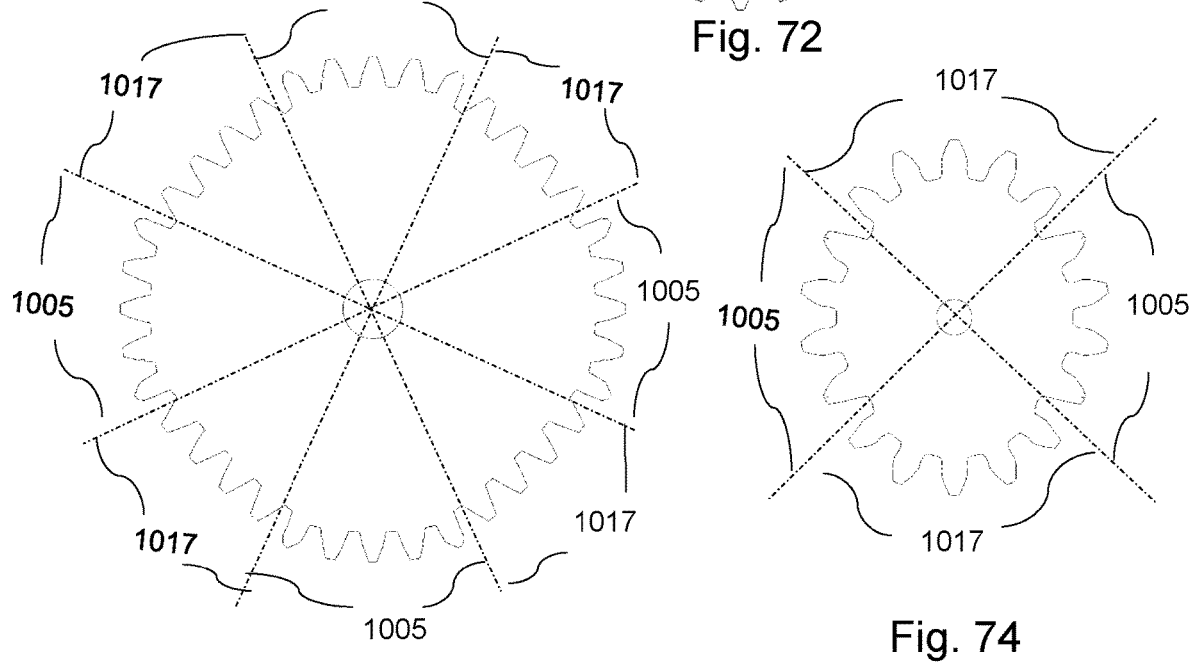
Fig. 73
Fig. 74

INFINITELY VARIABLE TRANSMISSION WITH UNIFORM INPUT-TO-OUTPUT RATIO THAT IS NON-DEPENDANT ON FRICTION

CROSS REFERENCE TO RELATED APPLICATIONS

1. Provisional Application
Application No. 61/788,563
Title: Continuous variable transmission
2. Non-Provisional Application
application Ser. No. 16/261,970
Title: Continuously variable transmission
3. Continuation In Part Application
application Ser. No. 15/455,201
Title: Continuously variable transmission

BACKGROUND OF THE INVENTION

Field of the Invention

This invention pertains to transmissions having variable ratios between input and output velocities. Specifically, it relates to all gear transmissions whose velocity ratios may be changed continuously over a wide range of values ranging from zero to non-zero values, without depending on friction.

Description of the Related Art

The U.S. Pat. No. 5,603,240 and US 20100199805 use some of the features used in this design.
The advantages in this invention include:
The U.S. Pat. No. 5,603,240 does not have a co-axial input to output and therefore cannot be used for applications requiring this configuration. The output travels as the ratio is changed. Therefore, this design cannot be used when stationary output is required. This new invention offers a stationary and co-axial input and output shaft. The envelope used in this invention is comparably smaller than that of the prior art.
US 20100199805 offers a sinusoidal output and uses several modules just to minimize the "ripple" when a steady and uniform input is provided. Therefore, the design cannot be used when a steady and uniform output is desired. This new invention offers a steady and uniform output when the input is steady and uniform. This can be achieved with as few as three modules namely rectifier modules. This is explained in detail in the subsequent paragraphs.

BRIEF SUMMARY OF THE INVENTION

The main objective of this invention is to provide a UNIFORM and STEADY output, when the input is uniform and steady, with the ability to transmit high torque without depending on friction or friction factor. Many of the continuously variable transmissions that are in the market today are friction dependent and therefor lack the ability to transmit high torque. Those continuously variable transmissions, which are non-friction dependent do not have a uniform and steady output when the input is uniform and steady. This design aids reduction in the overall size and can be economically mass produced. This design can be easily integrated into any system. This design is very versatile and can be used ranging from light duty to heavy duty applications. This design allows replacement of existing regular transmission, requiring very little modification. This design offers stationary and co-axial input and output.

BRIEF DESCRIPTION OF THE SEVERAL VIEWS OF THE DRAWINGS

All the gears in the following figures can be replaced with a sprocket and chain system. The non-circular gear system can be replaced with a sprocket and chain system where at least one of the sprockets is non-circular.
FIG. 3A-3B—Frame main housing—Two parts are bolted together to form one main housing:
   3A—Top of the main housing.
   3B—Side view showing the main housing.
FIG. 4A-4B Frame cross rack holder guide
   4A—Front view.
   4B—Top view
FIG. 5A-5B Non-circular gear frame—
   5A—Front view.
   5B Top view
FIG. 6A through 6G Cross rack assembly showing perspective view and orthographic views showing details of the crank pin slot 1013,
   orientation of the racks and details of the prongs:
   6A—Top view
   6B—Perspective view
   6C—Bottom view 2
   6D—Front view
   6E—Right Side view
   6F—Rear view
   6G—Left side view.
FIG. 7A through 7D-Pinion:
   7A—Front view
   7B—Side view
   7C—Top view
   7D—Perspective view
FIG. 8A through 8B-Pinion shaft:
   8A—Front view
   8B—Side view
FIG. 9A through 9C—Retainer crank pin:
   9A—Front view
   9B—Side view
   9C—Perspective view
FIG. 10A through 10C—Input disk:
   10A—Front view
   10B—Side view
   10C—Perspective view
FIG. 11A through 11C—Gear changing lever planetary mechanism:
   11A—Front view
   11B—Top view
   11C—Perspective view
FIG. 12—Compression spring Perspective view:
FIG. 13—Large bevel gear stationary differential collar Perspective view.
FIG. 14A through 14C Primary telescopic sleeve:
   14A—Front view
   14B—Side view
   14C—Perspective view
FIG. 15A through 15D—Secondary telescopic sleeve:
   15A—Front view
   15B—Side view
   15C—Top view
   15D—Perspective view FIG. 16A through 16C—Ratio cam disk:
16A—Front view
16B—Top view
16C—Perspective view
FIG. 17 A through 17C—Driven non-circular gear:
17A—Top view
17B—Front view
17C—Perspective view
FIG. 18A through 18C—Driving non-circular gear:
18A—Top view
18B—Front view
18C—Perspective view
FIG. 19A through 19C—Dummy crank pin:
19A—Top view
19B—Front view
19C—Perspective view
FIG. 20A through 20C—Crank pin:
20A—Top view
20B—Front view
20C—Side view
FIG. 21A through 21B—Intermediate circular gears C2-C3 which has two circular gears that are co-axial and rigidly connected:
21A—Side view
21B—Front view
FIG. 22A through 22C—Carrier gears C4a-C5a which has two circular gears that are co-axial and rigidly connected:
22A—Side view
22B—Front view
22C—Perspective view
FIG. 23A through 23C—Intermediate circular gear C4-C5 which has two circular gears that are co-axial and rigidly connected:
23A—Front view
23B—Top view
23C—Perspective view.
FIG. 24A through 24C—Intermediate circular gear C1
24A—Front view
24B—Top view
24C—Perspective view
FIG. 25A through 25C—Spacer used to keep two axes separated by a specific distance:
25A—Top view
25B—Front view
25C—Perspective view
FIG. 26A through 26D—Gear changing lever for spiral flute mechanism:
26A—Top view
26B—Front view
26C—Top view
26D—Perspective view
FIG. 27A through 27C—Spiral flute collar:
27A—Front view
27B—Side view
27C—Perspective view
FIG. 28A through 28C—Stationary differential collar:
28A—Front view
28B—Side view
28C—Section view
FIG. 29A through 29C Collar dynamic differential:
29A—Front view
29B—Side view
29C—Section view FIG. 30 thru 38—Views showing the movement/position on rack assembly, crank pin as input disk rotates: shown at various stages:
FIG. 30—Crank pin closer to the longitudinal axis and Input disk at 0°
FIG. 31—Crank pin closer to the longitudinal axis and Input disk at 45°
FIG. 32—Crank pin closer to the longitudinal axis and Input disk at 90°
FIG. 33—Crank pin at midpoint and Input disk at 0°
FIG. 34—Crank pin at midpoint and Input disk at 45°
FIG. 35—Crank pin at midpoint and Input disk at 90°
FIG. 36—Crank pin farthest from the gear and Input disk at 0°
FIG. 37—Crank pin farthest from the gear and Input disk at 45°
FIG. 38—Crank pin farthest from the gear and Input disk at 90°
FIG. 39A through 39B—Ratio cam disk, input disk and crank pin showing operation behind how the cam alters the crank pin location
FIG. 39A—Top view
FIG. 39B—Side view
FIGS. 40A and 40B—Views showing working of planetary gear changing mechanism:
FIG. 40A—Top view
FIG. 40B—Side view
FIG. 41 thru 46—Views describing the ratio changing operation of the differential mechanism at various stages shown partially sectioned to explain the function and interior details:
FIG. 54 Non-circular gear placed at 180°
FIG. 55 Non-circular gear placed at 30
FIG. 56 Non-circular gear placed at 90°
FIG. 57 Non-circular gear placed at 120°
FIG. 58—Graphical representation of output with overlaps and sequence of engagement for a complete cycle.
FIG. 59—Engagement of clutches for a forward-gear.
FIG. 60—Engagement of clutches for a reverse-gear.

FIG. 61—Engagement of clutches for a neutral-gear.

FIG. 62—Engagement of clutches for "Park".

FIG. 64—Multiple driving and driven non-circular gear are stacked in 2 layers and the sum of all the active functional portions of the two non-circular gear pairs is ☐360°.

FIG. 65A through 65D—Sliding collar link gear changing mechanism
   65A—Top view
   65B—Left view
   65C—Front view
   65D—Isometric view
   65E—Bottom View FIG. 66A through 66D—Optional sliding collar link gear changing mechanism
   66A—Top view
   66B—Front view
   66C—Right view
   66D—Isometric view FIG. 67—Alternate CVT assembly configuration—"Siamese" configuration (a) showing all the 4 rectifier modules 1001 are on the same side of the CVT.

FIG. 72—Two angular velocity modifier modules sharing the same driving non-circular gear FIGS. 73 and 74—4 parts of each of the non-circular gear that can be derived by mirroring each other FIG. 75—Way to compensate for deviation in rack movement with cams
   A—Isometric View
   B—Section View thru driven non-circular gear FIG. 76—Way to assist with force required to move the crank pin to change input-to-output ratio FIG. 77—Ideal rack velocity profile with smooth and gradual transitions. Angular displacement of the driving non-circular gear is on the X Axis. Rack Velocity is on the Y Axis.

DETAILED DESCRIPTION OF THE INVENTION

Summary of the Invention

Figure 1:
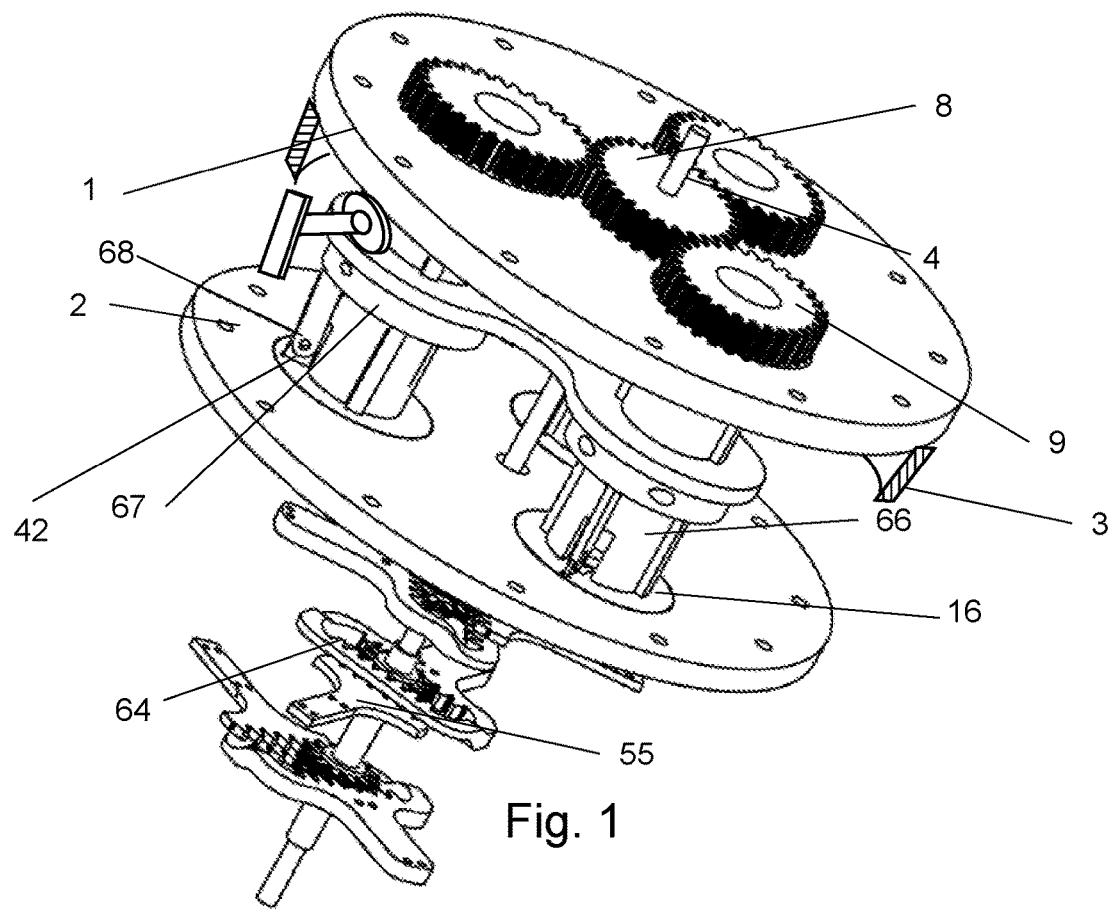
FIG. 1—CVT general assembly perspective view.
Figure 2:
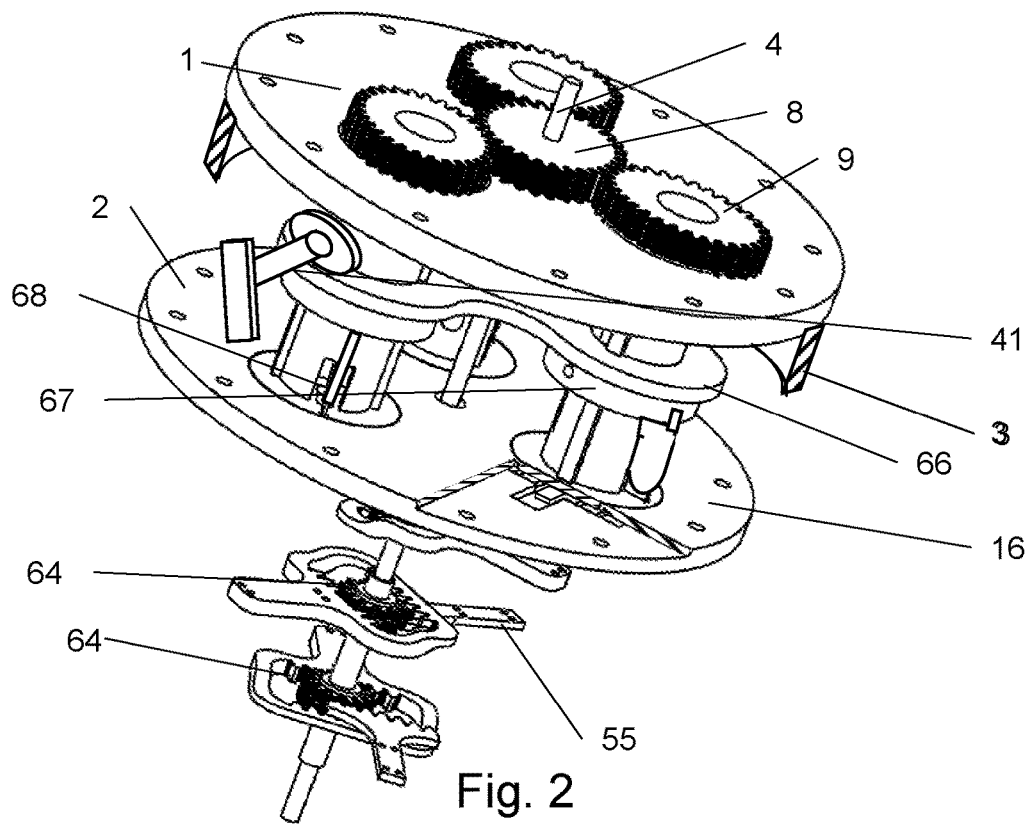
FIG. 2—CVT general assembly perspective view with frames partially sectioned out showing general arrangement of internal sub-assemblies.
Figure 39A:
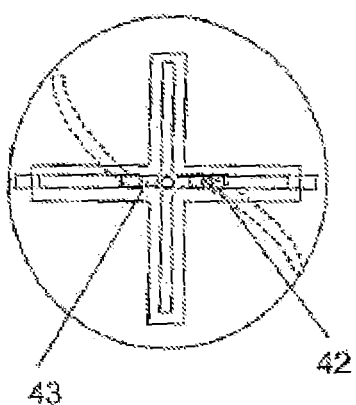
Figure 39B:
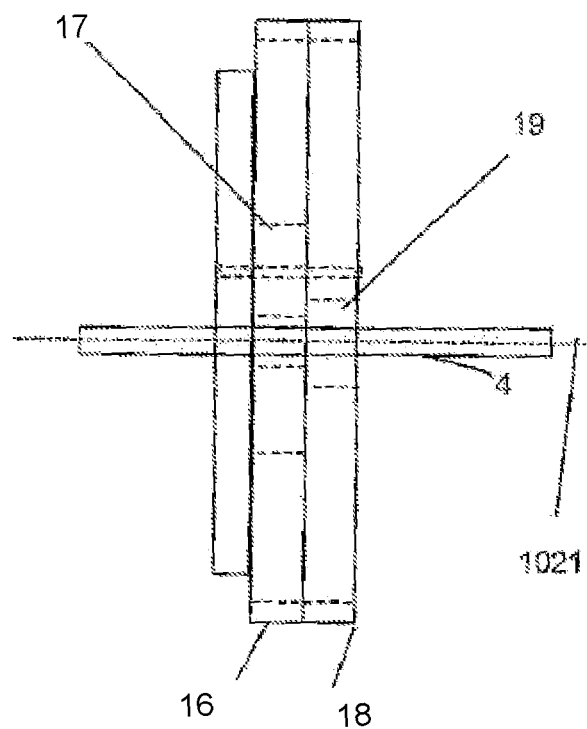
Figure 41:
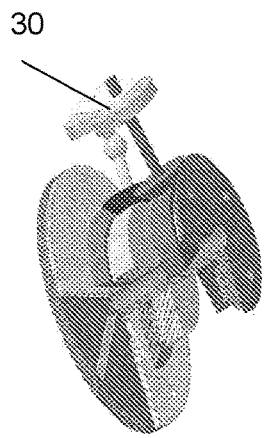
FIG. 41—Differential mechanism (partially sectioned) view 1.
Figure 42:
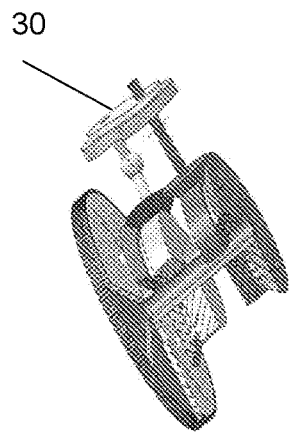
FIG. 42—Differential mechanism (partially sectioned) view 2.
Figure 43:
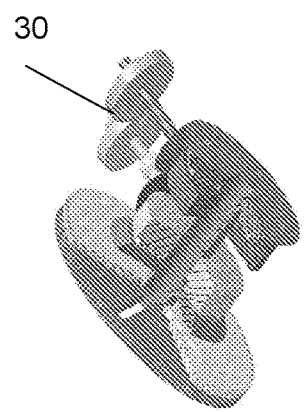
FIG. 43—Differential mechanism (partially sectioned) view 3.
Figure 44:
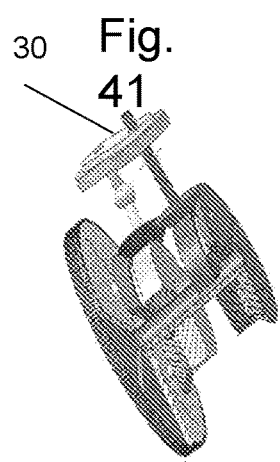
FIG. 44—Differential mechanism (partially sectioned) view 4.
Figure 45:
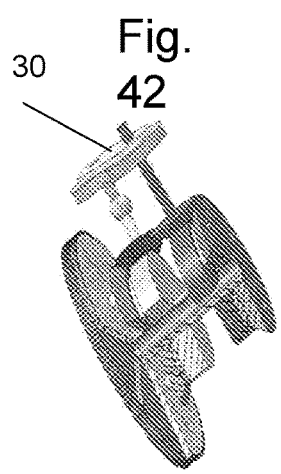
FIG. 45—Differential mechanism (partially sectioned) view 5.
Figure 46:
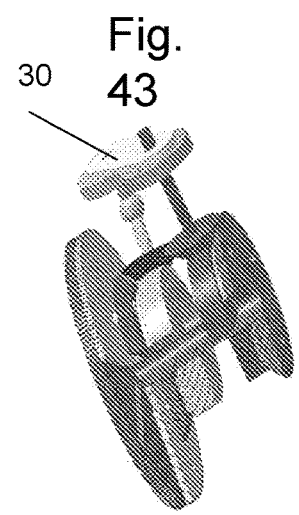
FIG. 46—Differential mechanism (partially sectioned) view 6.
Figure 47:
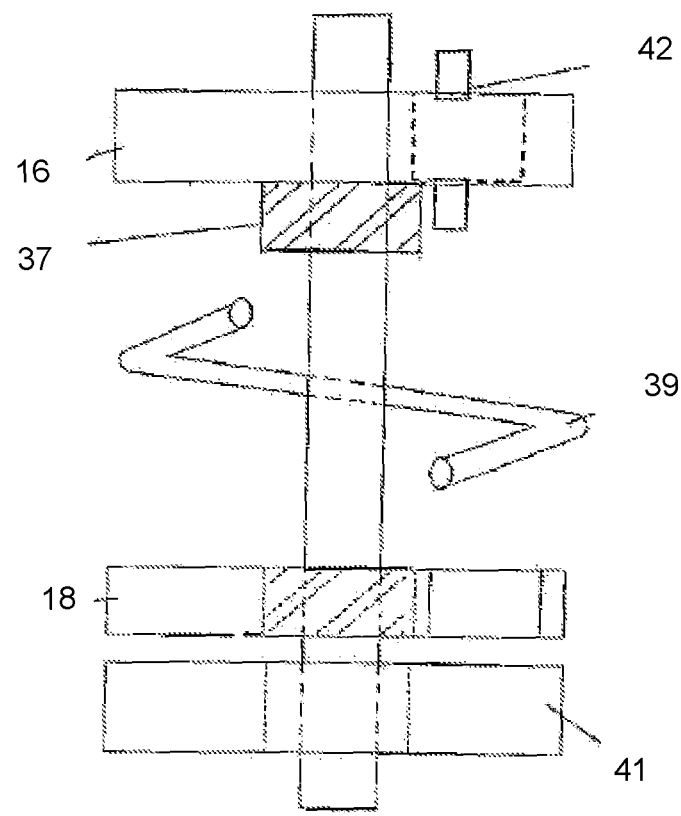
FIG. 47—Assembly showing working of gear changing mechanism—Spiral flute mechanism (exploded).
Figure 48:
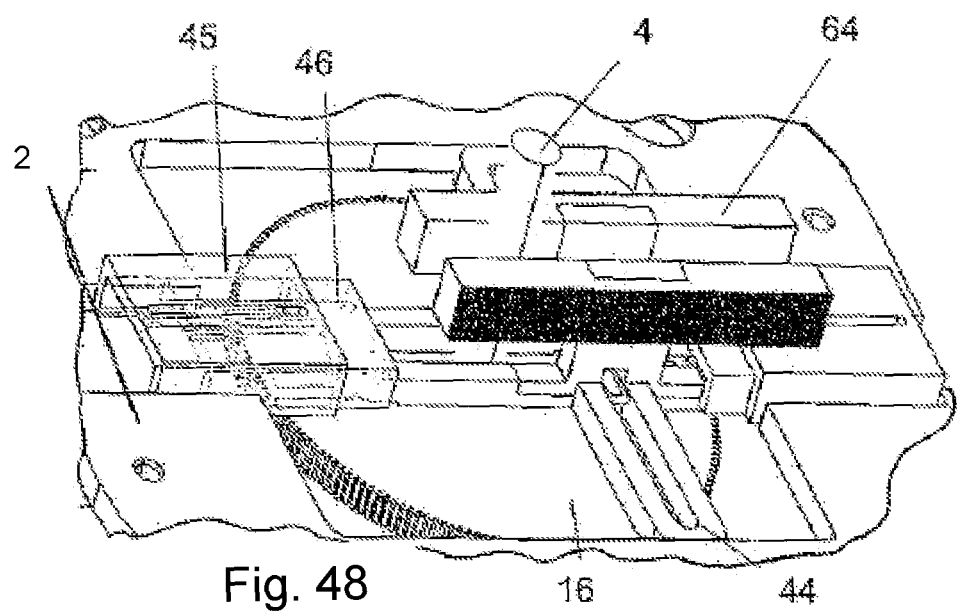
FIG. 48—Telescopic guide isometric view
FIG. 49—Exploded view of One way bearing assembly (Pinion partially sectioned showing interior details).
Figure 49:
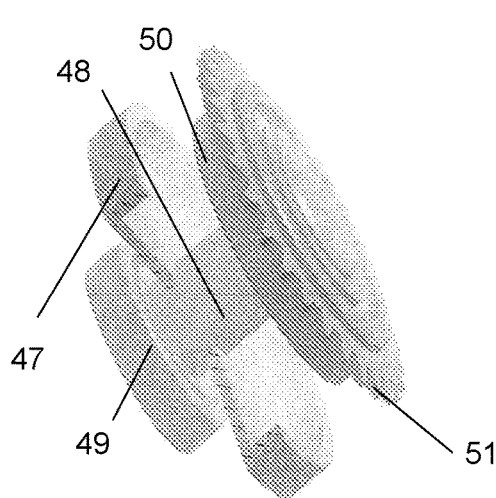

To briefly describe this invention is an Infinitely Variable Transmission (IVT). Unlike existing CVT designs, this particular design does NOT depend on friction to transmit power. Most of the CVTs that exist today depend on friction to transmit power and therefore cannot be used where there is a need to transmit high power at low speed. Due to this advantage, it is possible to use this invention where high torque transmission is required. Co-axial input and output can be achieved with this layout.

LIST OF COMPONENTS

All the gears in the following component list can be replaced with a sprocket and chain system. The non-circular gear system can be replaced with a sprocket and chain system where at least one of the sprockets is non-circular.
1) Frame main housing
2) Frame cross rack holder guide
3) Frame telescopic guide
4) Input shaft
5) Input shaft bearing
6) Intermediate gear shaft
7) Intermediate gear shaft bearing
8) Driving non-circular gear
9) Driven non-circular gear
10) Intermediate circular gear C1
11) Intermediate circular gears C2 C3
12) Intermediate circular gears C4 C5
13) Bearing collar
14) Circular gear C2 C3 bearing
15) Circular gear C4 C5 bearing
16) Input disk
17) Input disk bearing
18) Ratio cam disk
19) Ratio cam disk bearing
20) Intermediate circular gears C4a-C5a
21) Carrier shaft
22) Carrier shaft bearing
23) Planetary mechanism ratio changing lever
24) Input disk sleeve
25) Stationary differential collar
26) Stationary differential collar spur gear shaft bearing
27) Stationary differential collar spur gear shaft
28) a) Stationary differential small bevel gear
   b) Stationary differential large bevel gear
29) Stationary differential collar spur gear
30) Spur gear spacer
31) Dynamic differential collar
32) Dynamic differential collar spur gear shaft bearing
33) Dynamic differential collar spur gear shaft
34) a) Dynamic differential small bevel gear
   b) Dynamic differential large bevel gear
35) Dynamic differential collar spur gear
36) Universal joint
37) Spiral fluted collar
38) CVT output shaft
39) Compression spring
40) Thrust bearing
41) Ratio changing spiral flute mechanism lever
42) Crank pin
43) Dummy crank pin
44) Cross rack holder 45) Primary telescopic sleeve
46) Secondary telescopic sleeve
47) Pinion
48) Pinion shaft
49) Pinion bearing
50) Computer controlled clutch/one-way bearing/ratchet mechanism
51) Output gear/output sprocket
52) Power link shaft
53) Power link shaft bearing
54) Power link sprocket/power link gear
55) Dummy rack
56) Vibration cancellation mechanism wheel
57) Vibration cancellation mechanism wheel collar
58) Input shaft for miter/bevel gears
59) Miter/bevel gear
60) Clutch park/neutral/reverse
61) Miter/bevel gear differential output shaft
62) Intermediate gear non-circular gear connector
63) Intermediate gear non-circular gear connector guide
64) Rack
65) Co-axial output element with internal gear/planetary gear
66) Auxiliary input shaft
67) Auxiliary input shaft sliding collar
68) Link
69) Crank pin shaft
70) Crank pin collar
71) crank pin retainer
72) Spur gear
73) Crank pin rack
74) Notched input shaft
75) Modified input disk
76) Modified ratio cam disk
77) Gear cam
78) Input shaft cam
79) Stationary sun gear
80) Force compensation spring
81) Cam spring
82) Cam shaft
83) Driving sprocket
84) Driven sprocket
85) Sprocket chain
86) Tensioner
87) Compensating planetary gear
88) Carrier
89) Ring gear
90) Sun gear The working of this CVT can be described by the following simple sequential operations.

a) A crank pin 42 (FIG. 19), revolves around the longitudinal axis 1021 of an input disk 16 (FIG. 10) or an input shaft 4 or an auxiliary input shaft 66 at an offset distance 1025 as shown in FIG. 65, and this offset distance can be altered. The offset distance ranges from zero to a non-zero value. The concept described in this operation exists in another patent application US 20100199805. However, here an entirely different approach is adapted on how this concept is used, how the offset is altered etc. in a much simpler, and in a compact envelop.

b) This offset crank pin 42 is caged in
   1) the input disk 16 or alternatively in a crank pin shaft collar 70 that slides on a crank pin shaft 69, and
   2) a slot of a cross rack holder 44 (FIG. 6).

The cross rack holder 44 is restricted such that it can move only in the direction that is normal to its slot. A rack 64 is fastened to the cross rack holder 44, such that the rack 64 is parallel to the cross rack holder's 44 direction of movement. In the alternative construction, the crank pin shaft 69 is orthogonal to the input shaft 4. The revolution of the crank pin 42 about the longitudinal axis 1021 of input disk 16 is translated to pure linear back and forth movement or reciprocating movement of the rack 64. This mechanism is commonly known as "scotch-yoke mechanism" in the industry. The distance of this linear back and forth movement (stroke) is directly proportional to the radial distance of the crank pin 42 from the longitudinal axis 1021 of the input disk 16.

Since the work done is constant, which is a product of force applied multiplied by the distance traveled (F*stroke), for a smaller stroke, the force applied is greater and for a longer stroke, the force applied is smaller.

c) The rack 64 is linked to a pinion (FIG. 7) converting this linear movement of the rack 64 to rocking oscillation of the pinion 47.

d) This rocking oscillation is converted to a unidirectional rotation, using a computer controlled clutch/one-way bearing/ratchet mechanism 50. One main purpose of this invention is to achieve a CONSTANT AND UNIFORM output angular velocity when the input angular velocity is constant and uniform. However, using the steps described above, this is NOT achieved, as the output is sinusoidal.

By modifying the rate of change of angular displacement of the input disk 16, a uniform steady output can be achieved.

By using a set of non-circular gears, the driving non-circular gear 8 (FIG. 18) and the driven non-circular gear 9 (FIG. 17), the instantaneous rate of change of angular displacement at the input disk 16 can be altered. The output from the driven non-circular gear 9 is then transferred to the input disk 16 via some intermediate circular gears. The driving and the driven non-circular gears 8 & 9 can be replaced by a sprocket and chain system where at least one sprocket is non-circular. Also, all circular gears can be replaced with circular sprocket and chain system to achieve the same result.

Figure 70:
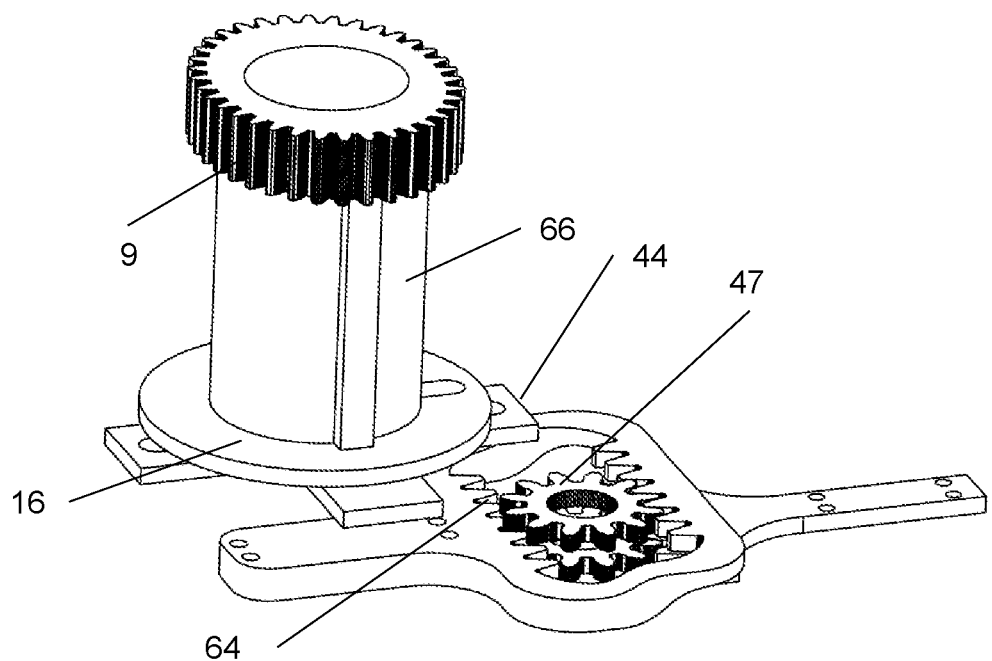
FIG. 70—Scotch-yoke module with driven non-circular gear
Figure 71:
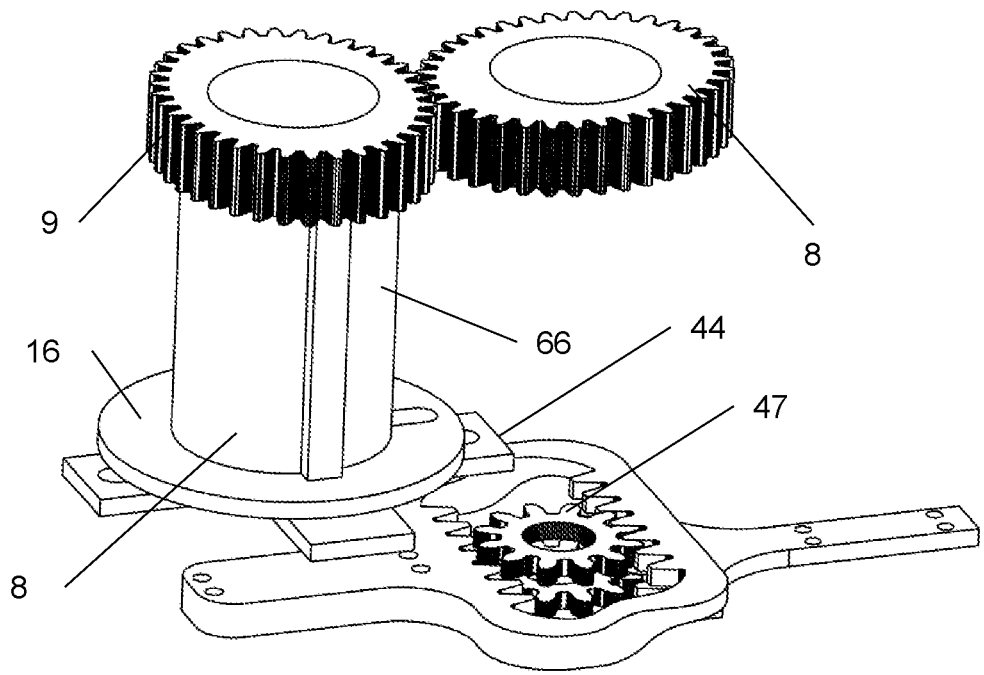
FIG. 71—Angular velocity modifier module with scotch-yoke module

The design construction is grouped into modules/mechanism for easier understanding: Detailed description of assembly, sub-assembly of components/modules and their functions:

a) Angular velocity modifier module (FIG. 71): The main purpose of this module is to change the uniform rate of power input to a reciprocal of sinusoidal output. This is to reverse the effect of the sinusoidal output in a scotch-yoke mechanism. This module comprises of:
   1) Driving non-circular gear 8,
   2) Driven non-circular gear 9 and
   3) Input shaft 4
   The driving non-circular gear 8 is mounted on the input shaft 4. This drives the driven non-circular gear 9.

b) Scotch-yoke module (FIG. 70): The main purpose of this module is to convert circular motion to a reciprocating motion. The output is sinusoidal for a steady, uniform input. This output is converted to a steady, uniform output using angular velocity modifier module.

This scotch-yoke module comprises of:
   1) input disk 16,
   2) Cross rack holder 44, and
   3) Crank pin 42

The input disk 16 has a radial slot, with optionally geared profile 1010 on its perimeter. The ratio cam disk (FIG. 16) has non-radial slot from center to the periphery with a minimum wall thickness. Optionally the ratio cam disk 18 also has a geared profile 1010 on its perimeter with identical pitch curve as in the input disk 16.

The input disk 16 and the ratio cam disk 18 are placed adjacent to each other. They are placed co-axial with respect to their longitudinal axes. The cross rack holder 44 has a slot namely "crank pin slot" 1013. It also has an extension on either side of the slot at the middle of the slot. This extension is normal to the crank pin slot 1013. This cross rack holder 44 optionally has another slot on this extension namely "input shaft slot" 1012. This slot is normal to the "crank pin slot" 1013. The purpose of this slot is to allow the option of input shaft 4 to pass through. The cross rack holder 44, is placed on the other side of the input disk 16 sandwiching the input disk 16 between the cross rack holder 44 and a ratio changing mechanism, which is described in subsequent paragraphs. The crank pin 42 passes through the slots of ratio changing mechanism, input disk 16, and cross rack holder 44 c) Rectifier module: The main purpose of this module is a mechanical equivalent to a diode in an electrical circuit. It allows power transfer to one specific direction.
  1) Rack 64,
  2) Pinion 47,
  3) Pinion shaft 48,
  4) Computer controlled clutch/one-way bearing/ratchet mechanism 50 and
  5) Output gear/output sprocket 51

The rack 64 is attached to the cross rack holder 44 normal to the crank pin slot 1013 and paired with the pinion 47. The pinion 47 is mounted on a pinion shaft 48. The computer controlled clutch/one-way bearing/ratchet mechanism 50 is mounted on the shaft pinion 48. The output gear/output sprocket 51 is mounted on the OD of the one-way bearing 50.

An alternative way to achieve two rectifier module using a common rack 64 a pinion 47 and a pinion shaft 48 is to use two Output gear/output sprocket 51 on the common shaft pinion 48 with the computer controlled clutch/one-way bearing/ratchet mechanism 50 to effective in opposite directions.

It is possible to use a common rack 64 for two rectifier modules which are phased 180° apart, by directly pairing one pinion 47 that is paired with the rack 64 in one rectifier module with another pinion 47 of another rectifier module which is phased at 180° and thereby eliminate the need for the additional rack 64 in one of the two rectifier modules.

d) Gear changing mechanisms: One of four different mechanisms are used on each scotch-yoke module here namely
  1) Planetary mechanism,
  2) Spiral flute mechanism,
  3) Differential mechanism, and
  4) Link mechanism The planetary mechanism, spiral flute mechanism and the differential mechanism mainly use the relative rotation of input disk 16 and the ratio cam disk 18 where the relative rotation is controlled by a synchronous control mechanism. This relative rotation is used by a crank pin displacement mechanism to achieve translation of the crank pin 42 radially.

Link mechanism uses the axial motion of a non-rotating disk and an axially stationary rotating disk. This relative motion is used by a suitable mechanism to achieve translation of the crank pin 42 radially. The construction details and the working of these mechanisms are discussed in detail in the subsequent paragraphs.

Operating principle of the gear changing mechanisms (methods to change ratio):

1) Planetary mechanism,

A set of intermediate circular gears C4a-C5a 20 (FIG. 22), where the gears C4a and C4b are axially connected, is mounted on a common carrier shaft 21. C4a has identical pitch curve to the circular gear's C4 pitch curve and C5a has identical pitch curve to the circular gear's C5 pitch curve. The movement of this longitudinal axis of the intermediate circular gears C4a-C5a 20 is restricted to a circular slot/path namely main housing slot 1024, which is at a constant distance from the longitudinal axes of the input disk 16 and the ratio cam disk 18, while the longitudinal axis of intermediate circular gears C4 C5 12 is stationary. The gear C4a is radially connected to gear C3 and the gear C5a is radially connected to the ratio cam disk 18. The gear C4 is radially connected to gear C3 and the gear C5 is radially connected to the input disk 16. A lever ratio changing planetary mechanism 23 (FIG. 11) pivoted on the frame enables the location of the carrier shaft 21 to move along the main housing slot. While the location is being displaced, there is a relative angular displacement between the input disk 16 and the ratio cam disk 18.

2) Spiral flute mechanism: A spiral fluted collar (FIG. 27) with twisted profile is axially attached to the input disk 16. A slot matching the twisted profile of the spiral fluted collar 37 is broached on the ratio cam disk 18 and placed co-axial to the input disk 16. When the distance between the ratio cam disk 18 and the input disk 16 remain unchanged, the input disk 16 and the ratio cam disk 18 spin synchronized. While the distance between the input disk 16 and the ratio cam disk 18 is being altered, the relative angular velocity between the input disk 16 and the ratio cam disk 18 changes as the ratio cam disk 18 is altered making ratio cam disk 18 to rotate with respect to the Input disk 16. This axial translation is achieved with a ratio changing spiral flute mechanism lever 41 that pushes a thrust bearing 40 attached to the Ratio cam disk 18 towards the input disk 16. This is sprung back with a compression spring 39 (FIG. 12) placed between the input disk 16 and the Ratio cam disk 18.

3) Differential mechanism:

A stationary differential large bevel gear 28b is axially attached to the input disk 16 via an input disk sleeve to differential large bevel gear 28b. A collar stationary differential 25 (FIG. 28), which is co-axially spaced to the stationary differential large bevel gear 28b, by a thrust bearing 40 is free to spin independently with respect to the stationary differential large bevel gear 28b. The Stationary differential collar 25 is restricted to move axially with respect to the stationary differential large bevel gear 28b. A, free to spin stationary differential collar spur gear shaft 27 is placed normal to the longitudinal axis of the stationary differential collar 25 in a bearing stationary differential collar spur gear shaft 26 placed in the collar stationary differential 25. A stationary differential small bevel gear 28a and a stationary differential collar spur gear 29 is axially and rigidly attached to the stationary differential collar spur gear shaft 27 and the stationary differential small bevel gear 28a is paired with the stationary differential large bevel gear 28b. Similarly, A dynamic differential large bevel gear 34b is co-axially placed parallel to the ratio cam disk 18 such that they spin synchronized but allowing displacement between them along the longitudinal axis.

A dynamic differential collar 31 (FIG. 29) which is co-axially placed to the dynamic differential large bevel gear 34b spaced by a thrust bearing 40 is free to spin independently with respect to the dynamic differential large bevel gear 34*b*. The dynamic differential collar 31 is restricted to move axially with respect to the dynamic differential large bevel gear 34*b*. A free to spin dynamic differential collar spur gear shaft 33 with a Universal joint 36 placed in its longitudinal axis is placed normal to the longitudinal axis of the dynamic differential collar 31 in a dynamic differential collar spur gear shaft bearing 32 placed in the dynamic differential collar 31. A dynamic differential small bevel gear 34*a* and a dynamic differential collar spur gear 35 is axially and rigidly attached to the dynamic differential collar spur gear shaft 33 and the dynamic differential small bevel gear 34*a* is paired with the dynamic differential large bevel gear 34*b*. The universal joint 36 is common to the shaft dynamic differential collar spur gear 33 and the dynamic differential small bevel gear 34*a*, allowing a small mismatch.

A spur gear spacer 30 keeps the two spur gears in contact. The spur gear spacer 30 (FIG. 25) is free to move axially with respect to shaft dynamic differential collar spur gear 33.

Here the Stationary differential collar 25 and the dynamic differential collar 31 are identical and interchangeable.

By this arrangement the dynamic flow train is as described below
- I. The stationary differential large bevel gear 28*b* spins stationary differential small bevel gear 28*a*.
- II. The stationary differential small bevel gear 28*a* spins the stationary differential collar spur gear shaft 27.
- III. The stationary differential collar spur gear shaft 27 spins the stationary differential collar spur gear 29.
- IV. The stationary differential collar spur gear 29 spins dynamic differential collar spur gear 35.
- V. The dynamic differential collar spur gear 35 spins dynamic differential collar spur gear shaft 33.
- VI. The dynamic differential collar spur gear shaft 33 thru the universal joint 36 spins the dynamic differential small bevel gear 34*a*.
- VII. The dynamic differential small bevel gear 34*a* spins the dynamic differential large bevel gear 34*b*.
- VIII. The dynamic differential large bevel gear 34*b* spins the ratio cam disk 18.

Since the two large bevel gears, the two small bevel gears, and the spur gears are identical and same size respectively, when the dynamic differential collar 31 is stationary, the angular velocity of the ratio cam disk 18 is synchronized with the input disk 16. While the dynamic differential collar 31 is being rotated with respect to the collar stationary differential 25, there will be a relative angular displacement between the input disk 16 and the ratio cam disk 18.

4) Link Mechanism:

The auxiliary input shaft 66 has a cross section with a circular hole in the middle and a non-circular shape for the exterior perimeter. This is paired with an auxiliary input shaft sliding collar 67 with a matching orifice, which is co-axially placed allowing axial movement while restricting rotational motion with respect to each other. A thrust bearing 40 is co-axially placed in contact with one end of the auxiliary input shaft sliding collar 67 and the auxiliary input shaft sliding collar 67 has a pivot 1028 on the other end. One end of a link 68 is attached to the pivot 1028 and the other end of the link 68 is either attached to the crank pin 42, as shown in (FIG. 65) or to the rank pin shaft collar 70, as shown in (FIG. 66) as appropriate. An axial displacement of the auxiliary input shaft sliding collar 67 will cause a radial displacement of the crank pin 42 thru the link 68. This axial translation is achieved with a ratio changing spiral flute mechanism lever 41 that pushes the thrust bearing 40 attached to the auxiliary input shaft sliding collar 67. This is sprung back with a compression spring 39 placed between input disk 16 and the auxiliary input shaft sliding collar 67. When this link mechanism is used, the need to have geared tooth profile 1010 on the perimeter of the input disk 16 is eliminated (FIG. 65D). Also, when this link mechanism is used the driven non-circular gear 9 can also function as the input disk 16 when a radial slot is added to the driven non-circular gear 9, thereby eliminating the need for a separate input disk 16.

A cross rack holder 44, input disk 16, driven non-circular gear 9, intermediate circular gears 12 and 20, crank pin 42, Ratio cam disk 18, and a ratio changing mechanism is used for two rectifier modules 1001 are used in one scotch-yoke module (FIG. 70) and two scotch-yoke modules are used in this assembly configuration.

Two racks 64 are placed on the cross rack holder 44 with a phase shift of 180°.

Another identical assembly of scotch-yoke modules (FIG. 70) with two rectifier modules 1001 is duplicated and placed such that the second assembly of scotch-yoke modules (FIG. 70) with two rectifier modules 1001 is a lateral inversion of the first assembly of scotch-yoke modules with two rectifier modules 1001 and rotated by 90°. The selection of the plane of lateral inversion creates multiple assembly configurations such as sequential assembly or Siamese assembly (FIG. 67) which is described below.

ASSEMBLY CONFIGURATIONS: Two assembly configurations are discussed here using the above-mentioned modules and a gear changing mechanism.

Namely:
1) Sequential configuration and
2) Siamese configuration with pinion linked to co-axial output shaft to input shaft via
   a) gears
   b) directly The main difference is how the modules and the gear changing mechanism are arranged and the space and the envelope it occupies. The sequential configuration has a smaller footprint but taller than the Siamese configuration. The choice depends on the available envelope for the CVT Sequential Configuration (FIG. 67):

The input shaft 4 is mounted on input shaft bearing 5 and placed in the center of a frame main housing 1 (FIG. 3). The driving non-circular gear 8, the intermediate circular gears C2 C3 11, the scotch-yoke module along with the ratio changing mechanism is mounted on the input shaft 4. Here the input shaft 4 is made to pass through the second slot, the input shaft slot 1012 of the cross rack holder 44. Intermediate gear shaft 6 is mounted on intermediate gear shaft bearing 7 and placed in the center of the frame main housing 1. The driven non-circular gear 9 along with intermediate circular gear C1 10 and intermediate circular gear C4-C5 12 is mounted on intermediate gear shaft 6 parallel to the input shaft 4 at a distance "CTR". The Intermediate circular gears C2 C3 11, intermediate circular gear C4-C5 12 and the input disk 16 have clearance fit such that they freewheel on their respective shafts.

The powertrain flow from the input shaft 4 to input disk 16 is as per the table provided below.

| From | To | Type of connection |
|---|---|---|
| Input-Shaft | Driven non-circular gear | Axial, Rigid |
| Driven non-circular gear | Driving non-circular gear | Radial |

-continued

| From | To | Type of connection |
| --- | --- | --- |
| Driving non-circular gear | Intermediate gear 1 | Axial, Rigid |
| Intermediate gear 1 | Intermediate gear 2 | Radial |
| Intermediate gear 2 | Intermediate gear 3 | Axial, Rigid |
| Intermediate gear 3 | Intermediate gear 4 | Radial |
| Intermediate gear 4 | Intermediate gear 5 | Axial, Rigid |
| Intermediate gear 5 | Input disk | Radial |

While the working of the CVT can be accomplished just with intermediate circular gears C1 10, intermediate circular gears C4 C5 12 and intermediate circular gears C4a-C5a 20, the intermediate circular gears C2 C3 11 are used to achieve 1:1 ratio between the driving non-circular gear 8 to input disk 16, if the ratio between the driving non-circular 8 gear and the driven non-circular gear 9 is not 1:1 or 1:1 where I is an integer or ½ depending on the relationship between the driving non-circular gear 8 and the driven non-circular gear 9.

Figure 68:
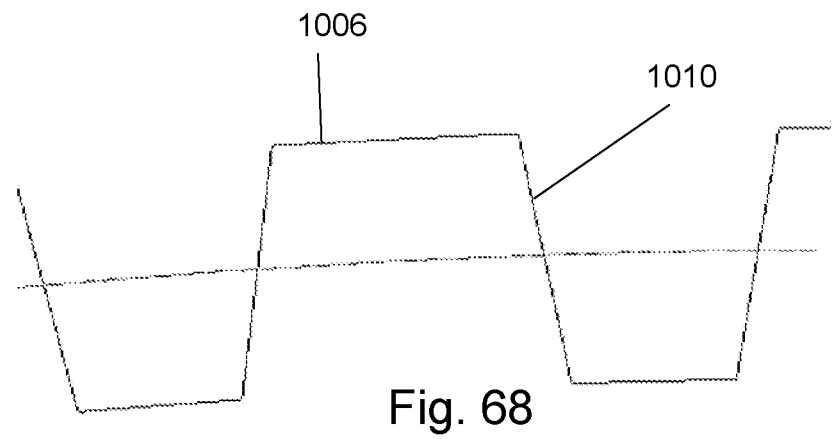
FIG. 68—A portion of the pitch curve and gear teeth profile of a gear

Two rectifier modules 1001 are placed next to the cross rack holder 44 as shown in FIG. 68 such that the rack 64 is placed normal to the cross rack holder's 44 crank pin slot 1013. When planetary mechanism is used, the crank pin 42 has a body shaped like rectangular prism with circular prism extended on both sides. One of them functions as a cam follower, made to engage with the ratio cam disk 18 and other functions as a crank pin 42, and made to engage with the rack 64 on the cross rack holder 44. This entire assembly, except the driving non circular gear 8 & driven non-circular gear 9 and the input shaft 4, is duplicated and mirrored about the mid-plane of the longitudinal axis of the driving non-circular gear 8, and rotated by 90°. The driven non-circular gear 9 is duplicated and rotated by 45° or 135° such that the racks 64 are placed at 90° phase shift to the next. The racks 64 on all the four rectifier modules 1001 share one common input shaft 4 and one common driving non-circular gear 8. Two of the rectifier modules 1001 share a common input disk 16 and gear changing mechanism. To accommodate this, the driven non-circular gear 9 is oriented at 45° with the driven non-circular gear 9 phased at 45° relative to the other driven non-circular gear 9. Also due to the fact the non-circular gears are symmetric it can be also oriented at 135°. This adds up to a 90° phase shift between racks 64. This arrangement will allow reduction in the "footprint" of the entire assembly. If the ratio between the angular velocities of the driving non-circular gear 8 and the driven non-circular gear 9 is 1:1 or 1:2, the input disk 16 can be directly connected to the driven non-circular gear 9 allowing the intermediate circular gears C1 to "free wheel" on its shaft.

The cross rack holder 44 is free to move only along the direction of the rack 64 and its movement is restricted by a frame cross rack holder guide 2. A set of telescopic sleeves, primary telescopic sleeve 45 and secondary telescopic sleeve 46 are placed on either side of the cross rack holder 44. This will decrease the overall size needed for the cross rack holder 44 and the frame main housing 1. A prong placed on either side of the cross rack holder 44 and another on the secondary telescopic sleeve 46, to pull and extend the telescopic sleeves and the telescopic sleeves are collapsed by the body of the cross rack holder 44. These telescopic sleeves are caged in by a frame telescopic guide 3 (FIG. 4).

Figure 50:
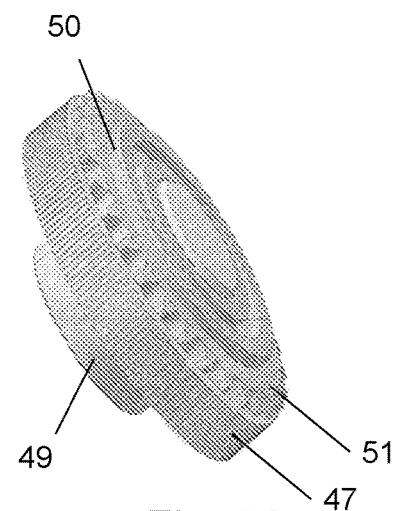
FIG. 50—One way bearing assembly.
Figure 51:
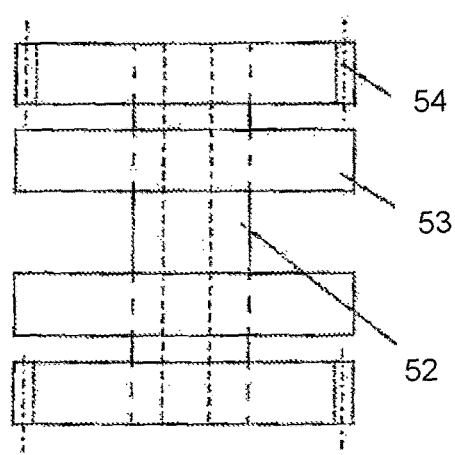
FIG. 51—Power link assembly.
Figure 52:
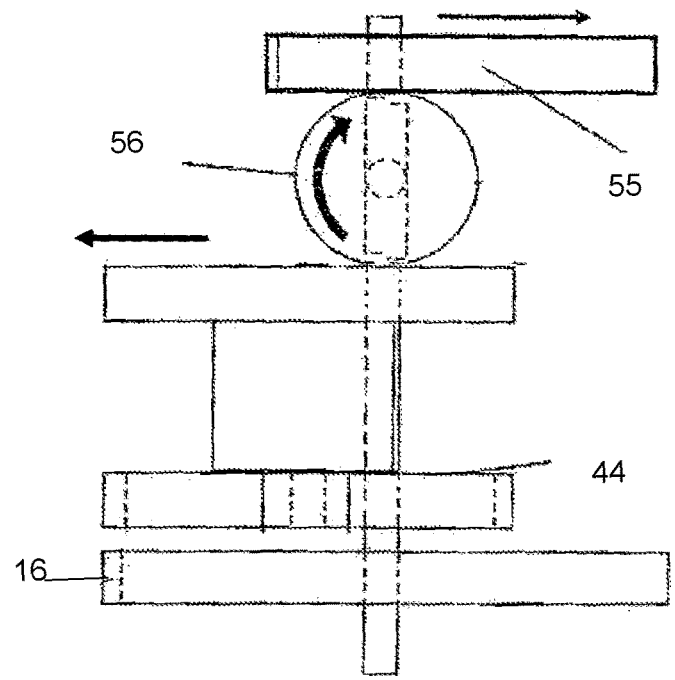
FIG. 52—Assembly showing concept of vibration cancelation.
Figure 53:
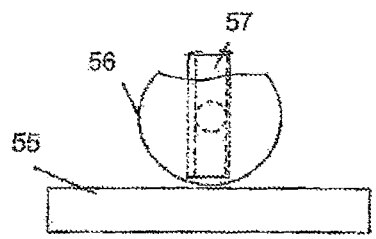
FIG. 53—Vibration cancelation mechanism: sub-assembly.
Figure 54:
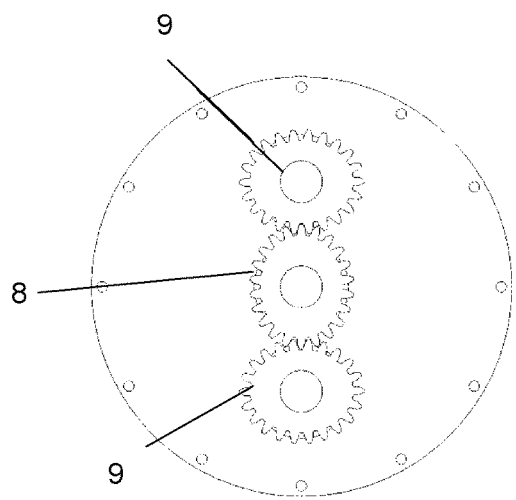
FIG. 54 thru 57—Options of placement of non-circular gear, when a common driving non-circular gear is used with two driven non-circular gear.
Figure 55:
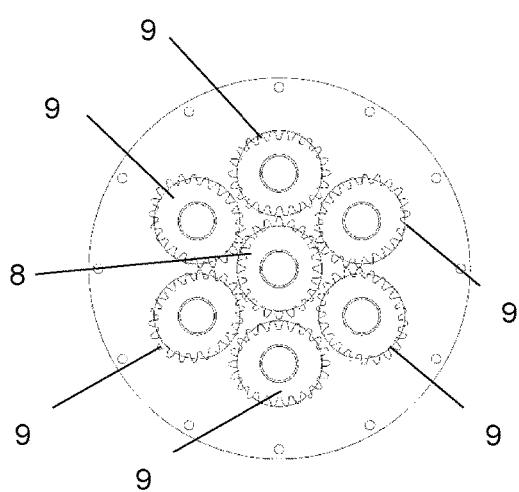
Figure 56:
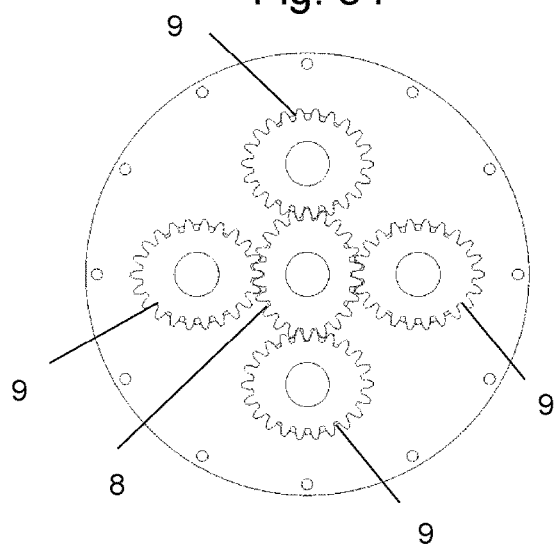
Figure 57:
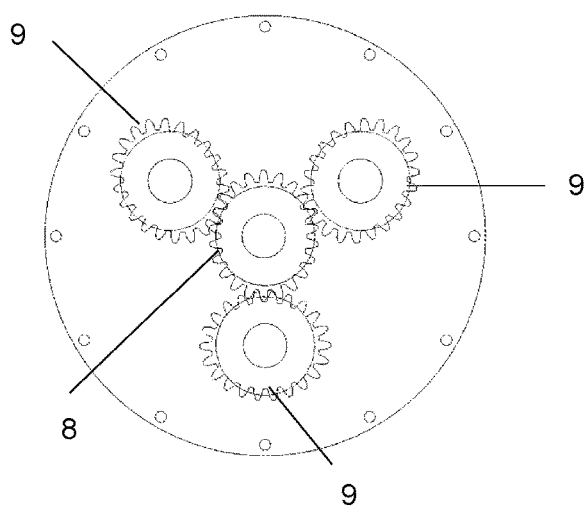

A power link assembly (FIG. 51) is placed parallel to the one-way bearing assembly (FIG. 50). The power link assembly consists of a power link shaft 52 that is mounted on two bearings that are placed on the frame telescopic guide 3. An output gear/output sprocket 51 is placed on the power link shaft's 52 each end. The power from the pinion shaft 48 is transmitted to the power link through this output gear/output sprocket 51.

The main purpose of the power link assembly is to link the output from each rectifier module so that they are connected in sequence with a set overlap and there is a continuous output. The power link assembly consists of a power link shaft 52 that is mounted on two bearings that are placed on the frame telescopic guide 3. A gear or sprocket is placed on the power link shaft's 52 each end. The power from the pinion shaft 48 is transmitted to the power link shaft 52 through this gear or sprocket.

Siamese Configuration (a) (FIG. 67):

Here the construction is identical to the sequential configuration except as noted below.

Figure 69:
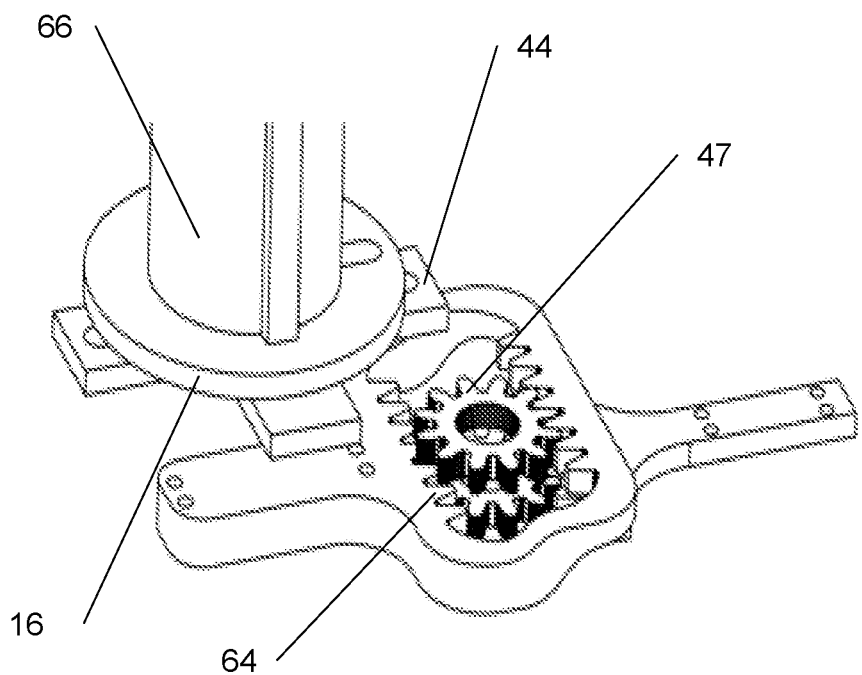
FIG. 69—Scotch-yoke module

In this alternative assembly configuration, the scotch-yoke module FIG. 69 and the driven non-circular gear 9 along with the ratio changing mechanism are placed on the auxiliary input shaft 66. The input disk 16 and the driven non-circular gear 9 are directly connected to the auxiliary input shaft 66. Here the need for the second slot, the input slot, on the cross rack holder 44 is eliminated. This eliminates the risk of input shaft 4 slipping into crank pin slot 1013 of the cross rack holder 44 or the crank pin 42 slipping in to the input slot of the cross rack holder 44. Depending on the selection of the ratio changing mechanism, the auxiliary input shaft 66 shaft could have a circular cross section. This modular sub-assembly is placed parallel to the input shaft 4, and mirrored about a plane containing the longitudinal axis of the input shaft 4, such that the planes formed by the longitudinal axis of the input shaft 4 and the longitudinal axis of the auxiliary input shaft 66 form an angle equal to 135°. This configuration has the outputs from each rectifier module 1001 to be placed on the same side of the frame. This allows linking of outputs using output gear/output sprocket 51 and chain and thereby eliminates the need for the power link shaft 52. The input shaft 4 is mounted on two input shaft bearing 5 and placed in the center of the frame main housing (s) 1 (FIG. 3). The input disk 16 is mounted on the input shaft 4 and sandwiched between the rack holder (FIG. 6) and the ratio cam disk 18 and the crank pin 42 is caged in the slot, The crank pin 42 has a body shaped like rectangular prism with circular prism extended on both sides. One of them functions as a cam follower, made to engage with the ratio cam disk 18 and other functions as a crank pin 42, and made to engage with the rack 64 on the cross rack holder 44. Parallel to the input disk 16 the driving non-circular gears is mounted on the input shaft 4. The intermediate gear shaft 6 is mounted on Intermediate gear shaft bearing 7, with one in each of the frame main housing 1. The Intermediate gear shaft 6 is placed parallel to the input shaft 4 at a distance "CTR" that is used to derive the shape of the non-circular gears. The powertrain flow from the input shaft 4 to the input disk 16 is as per the table provided below.

| From | To | Type of connection |
| --- | --- | --- |
| Input shaft | Driven non-circular gear | Axial, Rigid |
| Driven non-circular gear | Driving non-circular gear | Radial |
| Driving non-circular gear | Intermediate gear 1 | Axial, Rigid |
| Intermediate gear 1 | Intermediate gear 2 | Radial |
| Intermediate gear 2 | Intermediate gear 3 | Axial, Rigid |
| Intermediate gear 3 | Intermediate gear 4 | Radial |

-continued

| From | To | Type of connection |
|---|---|---|
| Intermediate gear 4 | Intermediate gear 5 | Axial, Rigid |
| Intermediate gear 5 | Input disk | Radial |

Siamese configuration (b) includes vibration cancellation dummy rack, multiple racks per module, co-axial input shaft that passes thru the hollow output that is that is directly linked to pinion(s) via one-way bearing.

Arrangement of Transmission of Power from Engine/Power Source to Input Disk 16:

By using a set of non-circular gears, the driving non-circular gear 8 and the driven non-circular gear 9, the rate of change in angular displacement at the input disk 16 is altered. The output from the input shaft 4 is transferred through a set of non-circular gears and then transferred to the input disk 16 via five intermediate circular gears. The driving non-circular gear 8 is mounted directly on the input shaft 4. The driven non-circular gear 9 is mounted on the intermediate gear shaft 6, which is mounted on two intermediate gear shaft bearing 7 and placed on the two frame main housing 1.

The intermediate circular gear C1 10 is mounted on the intermediate gear shaft 6, with a direct connection to the driven non-circular gear 9. The intermediate circular gears C2 C3 11 (FIG. 21) is mounted on the input shaft 4, free to spin with a bearing circular gear C2-C3 14. The intermediate circular gears C4 C5 12 (FIG. 22) is mounted on the shaft intermediate gear 6 that is free to spin with a bearing circular gear C2-C3 14 and intermediate gear C5 drives the input disk 16.

Reason behind the need for a circular gear between the non-circular gears when the pitch-curve 1006 interferes/multiple contacts at the same instant: This also can be eliminated by having multiple layers for the non-circular gears.

From the equations for the non-circular gear pitch-curves 1006, it can be seen that the radius of the driven non-circular gear 9 is lower than the input shaft 4 it is mounted on over a wide region and reaches zero at two locations. In addition, there is a potential that, due to the shape of the pitch curve 1006, the driven non-circular gear 9 and the driving non-circular gear 8 may have multiple contact points at a given time. This can be eliminated by inserting an intermediate gear non-circular gear connector 62 between the two non-circular gears. This increases the distance between the two non-circular gears and eliminates the issue of multiple contact point at any given time.

Crank Pin-Displacement-Mechanism:

Two concepts are used namely 1) Axis at slot intersection and 2) Axis on Rack

Crank pin Axis at slot intersection: This can be achieved by rotating the Ratio cam disk 18 which has a slot with a certain profile. When the Ratio cam disk 18 is rotated with respect to the input disk 16 this profile forces the crank pin 42 to move in radial direction of the disk's longitudinal axis. This is because the longitudinal axis of the crank pin 42 intersects the slot input disk 16 and the slot in the Ratio cam disk 18. When the crank pin 42 is closer to the longitudinal axis 1021 of the input disk 16 the stroke is shorter and since the work done is constant, the force is increased. Similarly, with the crank pin 42 is farther from the longitudinal axis 1021 of the input disk 16, the stroke is longer and since the work done is constant, the force is decreased. The challenge here is to have the ratio cam disk 18 and the input disk 16 spinning synchronized during normal operation however, and when the ratio change is desired, the input disk 16 and the ratio cam disk 18 should have a relative angular velocity. By using one of the three mechanisms described below, a relative angular velocity between the input disk 16 and the ratio cam disk 18 can be achieved, when desired.

Crank pin axis on the rack: Here a spur gear 72 is mounted on the modified input disk 75 and the modified ratio cam disk 76 has a ring gear profile matching the spur gear 72. The relative instantaneous rotation of the modified input disk 75 and the modified ratio cam disk 76 is used to spin the spur gear mounted on the input disk 16, which in turn moves a crank pin rack 73 attached to the crank pin 42. Here the crank pin rack 73 is placed in the notched input shaft 74 such that the crank pin 42 can be moved co-axial with the input disk 16 allowing a zero oscillation of the rack 64.

Concept Behind Using Telescopic-Sleeve to Enable Compact Design:

For this design to work the length of the input slot of the rack assembly has to be a value equal to 2*stroke+input shaft diameter+2*minimum material thickness+2*the distance to reach the rack guide. This entire length has to be guided by the rack guide. Since the rack guide also has to accommodate the travel of the ack 64, the opening portion of the rack guide should have a width at least as the diameter of the input disk 16 or it will be out of reach when the rack 64 travels to one side to the extreme. The telescopic guide extends the support and as a result, the overall length of the rack assembly can be reduced by the "distance to reach the rack guide." This also makes it possible for the frame main housing I to be shorter by that distance. Prongs are provided in the design of the rack assembly and in the secondary telescopic sleeve 46 to extend the telescopic sleeves. The body of the cross rack holder 44 collapses the telescopic sleeves.

Concept Behind Use/Working Function of Crank Pin Retainer 71:

The crank pin 42 is much smaller than the input shaft 4. Since both the slots cross each other, there is a potential that the crank pin 42 can slip in to the input shaft slot. This is eliminated by using a crank pin retainer 71 (FIG. 9) that is larger than the input shaft slot.

This is made to float in the crank pin slot enclosing the crank pin 42.

Figure 58:
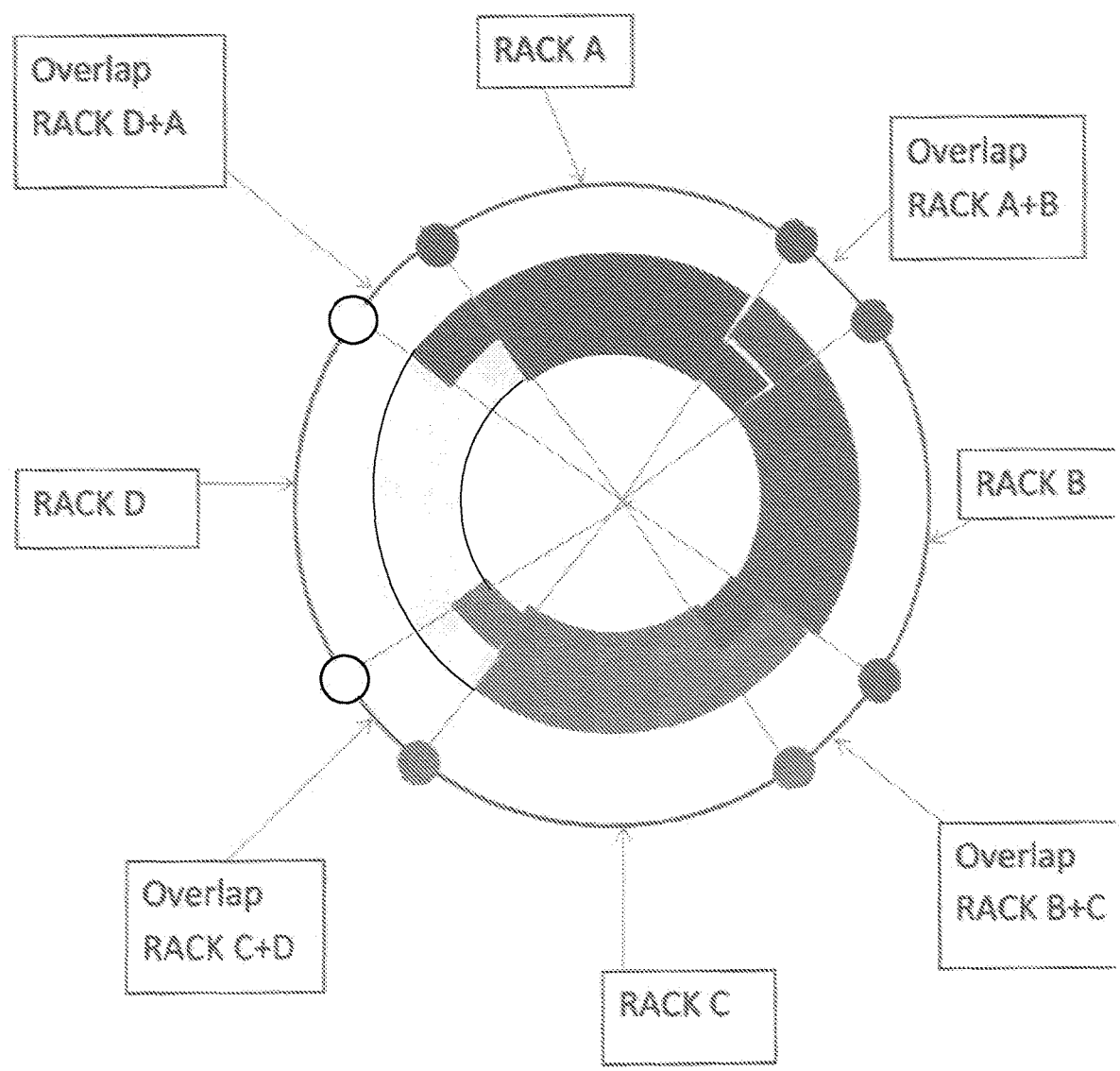
Figure 59:
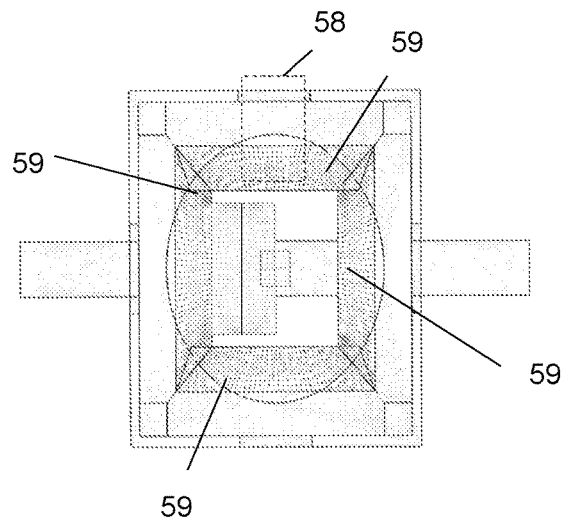
FIG. 59 thru 62—Miter/bevel gear assembly describing forward, reverse, neutral and park gear.
Figure 60:
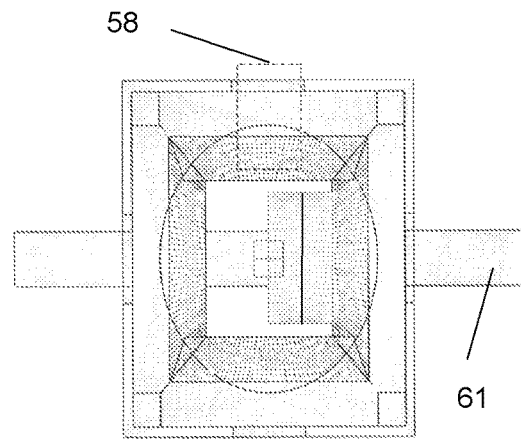
Figure 61:
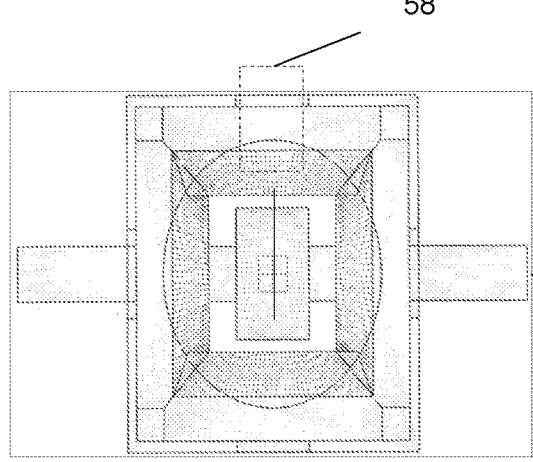
Figure 62:
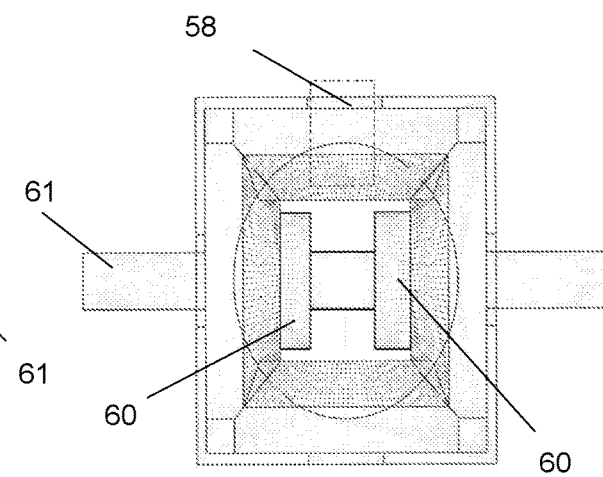
Figure 63:
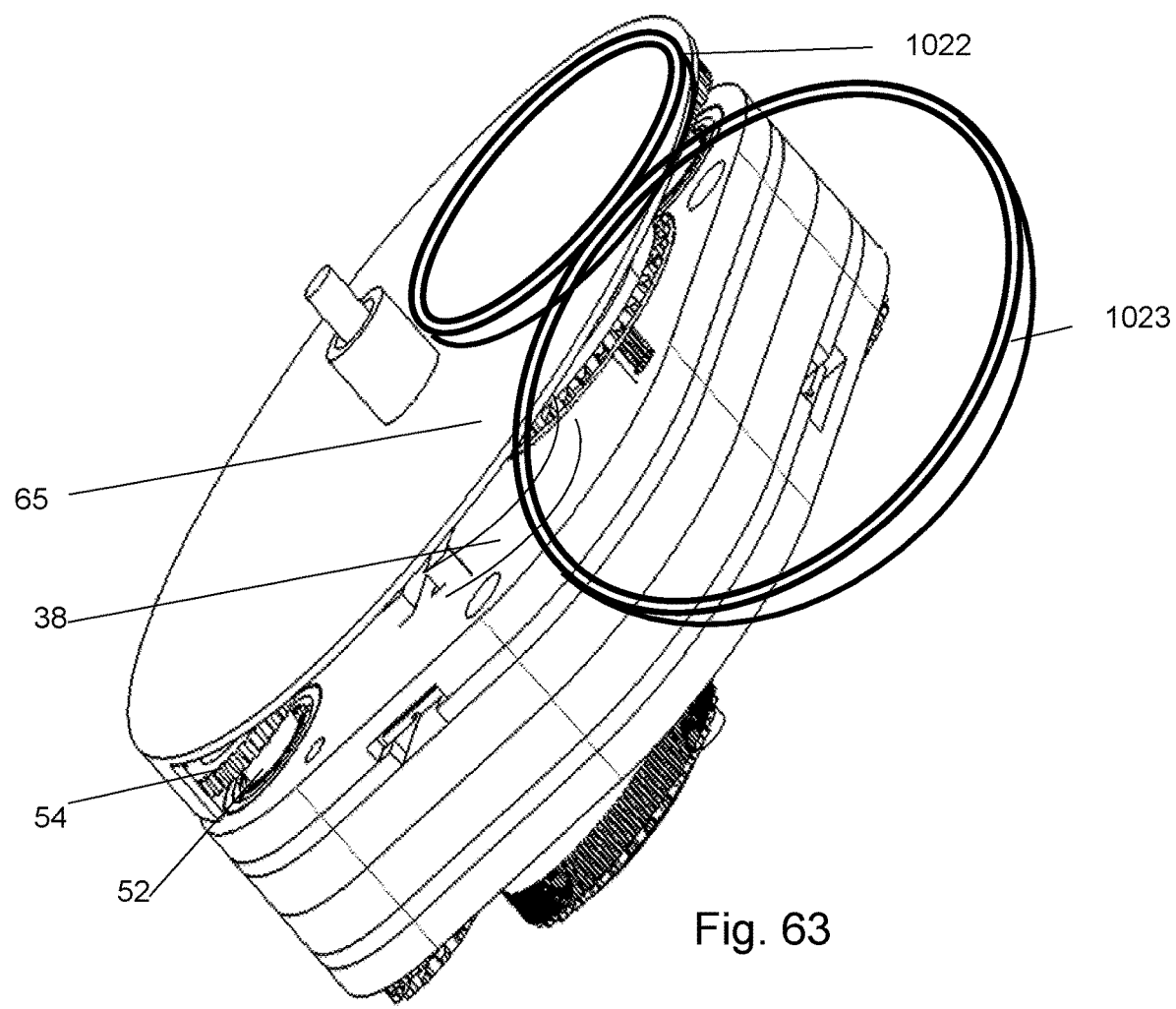
FIG. 63—Detail showing arrangement of co-axial output member in the assembly

Concept of Overlap of Power Transmission:

To ensure smooth transition from one rectifier module 1001 to the next, for a brief period both the rectifier modules 1001 are active and engage when the output from both of them reach a constant and uniform value. The overlap between each pair of adjacent rectifier modules is substantially identical (FIG. 58). The first rectifier module 1001 disengages while it is still in the functional region 1017 and the second rectifier module 1001 is well in the functional region 1017. The functional region 1017 of the non-circular gear can be defined as the region when in contact, the rack 64 has a constant velocity. When the computer-controlled clutch is used, it links the pinion shaft 48 to the output gear/output sprocket 51, only when the pinion 47 rotates in a specific direction and when the respective driven non-circular gears 9 are in a functional region 1017 as shown in FIG. 72.

Modules and their Assembly Layout and Constraints:

All the four rectifier modules 1001 share one common input shaft 4 and one common driving non-circular gear 8. Two of the rectifier modules 1001 share a common input disk 16 and a gear changing mechanism. The racks 64 are placed at 90° phase shift to the next. To accommodate this, the driven non-circular gear 9 is oriented at 45° with the driven non-circular Gear 9 phased at 45° relative to the other driven non-circular gear 9. Also due to the fact the non-circular gears are symmetric it can be also oriented at 135°. This adds up to a 90° phase shift between racks 64.

Concept of Power Transfer/Link Between Modules:

When the rectifier modules 1001 operate in sequence, they must be linked before the power is transferred to the wheel system 1022. This is achieved by using a power link shaft 52 that has output gear/output sprocket 51 to link the output from each rectifier module 1001 such that it has a continuous power to the wheel system 1022. The power is also transferred in sequence. The rectifier modules 1001 are oriented such that their non-circular gears are in functional region 1017 in sequence with overlap 1016 (FIG. 58) when the input disk 16 completes about one revolution, ensuring that at least one rectifier module 1001 is in functional region 1017 at any given time, thus completing about one cycle.

Reverse Gear Mechanism:

The output from the CVT output shaft 38 or the co-axial output element with internal gear/planetary gear 65 is coupled with input shaft for miter/bevel gears 58. The output of these miter/bevel gear 59 will therefore rotate in opposite directions. The miter/bevel gear differential output shaft 61 of this differential mechanism is placed co-axial to the output miter/bevel gear 59 with clearance so that it is free to spin independently with respect to the output miter/bevel gear 59. Two collars with a clutch are placed on the miter/bevel gear differential output shaft 61 allowing them to move axially. These can be made to link with either of the output miter/bevel gear 59, which rotate in opposite direction. When one of the collars is made to link via the clutch park/neutral/reverse 60, by means of clutch, with a particular output miter/bevel gear 59 and the miter/bevel gear differential output shaft 61 will rotate in a particular direction. It will reverse its direction if the link is swapped to the other miter/bevel gear 59.

Neutral Gear Mechanism:

When the collars are not in link via the clutch park/neutral/reverse 60 with any of the miter/bevel gear 59, the collar and the miter/bevel gear differential output shaft 61 is not restricted and, therefore, they are free to spin in any direction and function as a "neutral" gear.

Park Mechanism:

When the collars are in link via the clutch park/neutral/reverse 60 with both the miter/bevel gear 59, the collar is restricted from spinning and the miter/bevel gear differential output shaft 61 is totally restricted and, therefore, they are restricted to spin in any direction and functions as a "parking" gear.

Feature and Mechanism to Compensate Vibration:

1. Dummy crank pin 43: The crank pin 42 is placed off-center when the input disk 16 revolves. This imbalance will result in vibration. To compensate this, a dummy crank pin 43 is placed at same distance 180° apart. This is moved by the same Ratio cam disk 18 that moves the crank pin 42. This movement is identical to the movement of the crank pin 42. The cam slots are made identical at 180° apart.

2. dummy rack 55 for counter oscillation: As the input disk 16 rotates the cross rack holder 44 has an oscillatory motion which will result in vibration. It is cancelled by having an appropriate mass oscillating in the opposite direction. This is achieved by attaching a vibration cancellation mechanism wheel 56 in contact with the rack 64, which will spin back and forth. Bringing an appropriate mass in contact with the vibration cancellation mechanism wheel 56 at 180° apart will compensate for this vibration.

Co-Axial Input-Output Option Feature:

When co-axial input and output is desired, this can be achieved by adding a co-axial output element with internal gear/planetary gear 65 which has an internal gear, namely a ring gear placed co-axial with input shaft 4. The co-axial output element with internal gear/planetary gear 65 will radially connect with all the output gear/output sprocket 51 and the power link sprocket/power link gear 54, directly or via an intermediate gear or planetary gears of a planetary gear system.

Converting CVT to an IVT (Infinitely-Variable-Transmission):

Having a co-axial input and output allows the CVT to function as an IVT. This can be achieved by adding a planetary gear system (FIG. 84A-84F) with a sun gear 90, ring gear 89 and planetary gears supported by carriers 88, and linking with input shaft 4, the co-axial output element with internal gear/planetary gear 65.

The following are the options to achieve this:

a) The input shaft 4 is directly linked to the sun-gear of the planetary gear system with following 2 sub-options
   a. The co-axial output element with internal gear/planetary gear 65 is directly linked to the carrier 88 of the planetary gear system and ring gear 89 of the planetary gear system functions as the final output or wheel system 1022
   b. The co-axial output element with internal gear/planetary gear 65 is linked to the ring gear 89 of the planetary gear system and the carrier 88 functions as the final output or wheel system 1022.

b) The co-axial output element with internal gear/planetary gear 65 is directly linked to the sun gear 90 of the planetary gear system with following 2 sub-options.
   a. The input shaft 4 is directly linked to the carrier 88 of the planetary gear system and the ring gear 89 of the planetary gear system and the ring gear 89 of the planetary gear system functions as the final output or wheel system 1022.
   b. The input shaft 4 is directly linked to the ring gear 89 of the planetary gear system and the carrier 88 functions as the final output or wheel system.

c) The input shaft 4 is directly linked to the ring gear 89 of the planetary gear system with following 2 sub-options
   a. The co-axial output element with internal gear/planetary gear 65 is directly linked to the carrier 88 of the planetary gear system and sun gear 90 of the planetary gear system functions as the final output or wheel system 1022.
   b. The co-axial output element with internal gear/planetary gear 65 is linked to the sun gear 90 of the planetary gear system and the carrier 88 functions as the final output or wheel system 1022.

d) The co-axial output element with internal gear/planetary gear 65 is directly linked to the ring gear 89 of the planetary gear system with following 2 sub-options.
   a. The input shaft 4 is directly linked to the carrier 88 of the planetary gear system and the carrier 88 of the planetary gear system and the sun gear 90 of the planetary gear system functions as the final output or wheel system 1022.
   b. The input shaft 4 is directly linked to the sun gear 90 of the planetary gear system and the carrier 88 functions as the final output or wheel system 1022.

e) The input shaft 4 is directly linked to the carrier 88 of the planetary gear system with following 2 sub-options
   a. The co-axial output element with internal gear/planetary gear 65 is directly linked to the ring gear 89 of the planetary gear system and sun gear 90 of the planetary gear system functions as the final output or wheel system 1022.
  b. The co-axial output element with internal gear/planetary gear 65 is linked to the sun gear 90 of the planetary gear system and the sun gear 90 functions as the final output or wheel system 1022.
f) The co-axial output element with internal gear/planetary gear 65 is directly linked to the carrier 88 of the planetary gear system with following 2 sub-options.
  a. The input shaft 4 is directly linked to the ring gear 89 of the planetary gear system and the ring gear 89 of the planetary gear system and the sun gear 90 of the planetary gear system functions as the final output or wheel system 1022.
  b. The input shaft 4 is directly linked to the sun gear 90 of the planetary gear system and the ring gear 89 functions as the final output or wheel system 1022.

In other words, the co-axial output element with internal gear/planetary gear 65 is connected to one of the three elements, either a ring gear 89, a carrier 88, or a sun gear 90 of a planetary gear system. The input shaft 4 is connected to one of the remaining two elements of the planetary gear system. The third remaining element of the planetary gear system functions as the final output or wheel system 1022. This converts the CVT to an IVT.

Concept of Temporary Storage of Power in a Flywheel:

When the power from the engine or power source is not transmitted to the final output or the wheel system, the power can be transferred to a flywheel system 1023 temporarily and transferred back to input shaft 4 and then to the final output or the wheel system 1022 or directly to the final output or wheel system 1022 when desired.

Figure 75A:
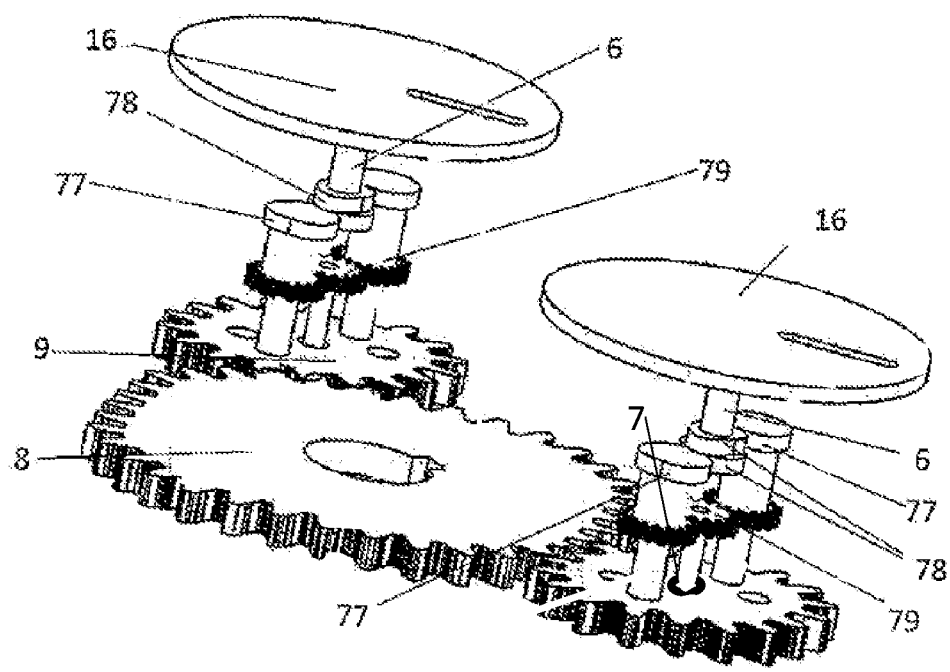
Figure 75B:
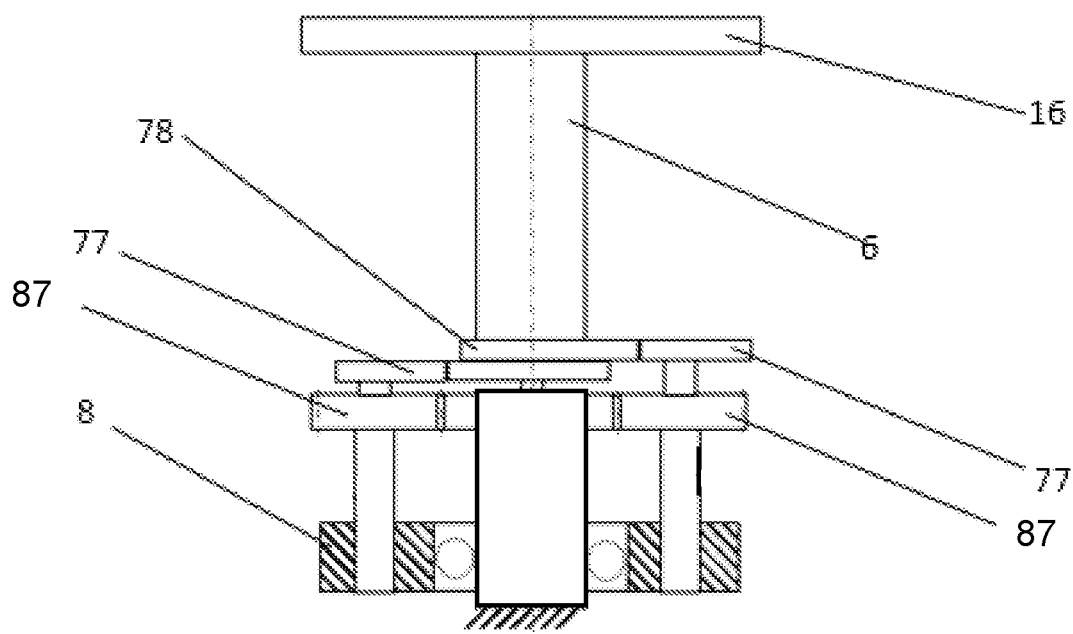
Figure 76:
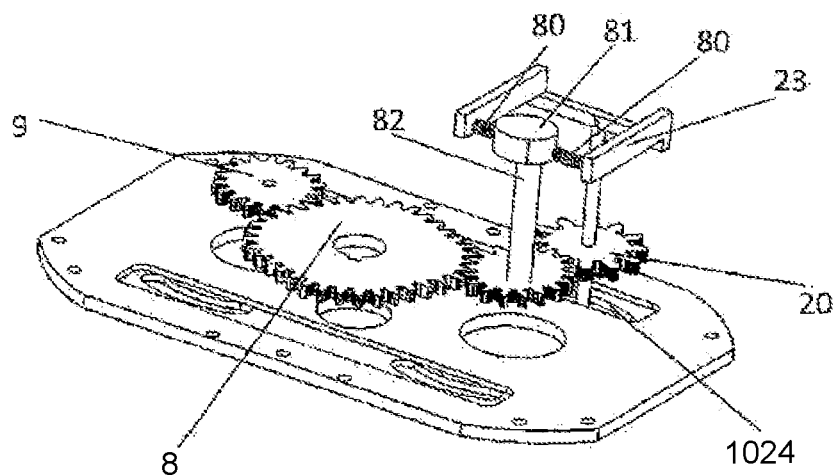
Figure 77:
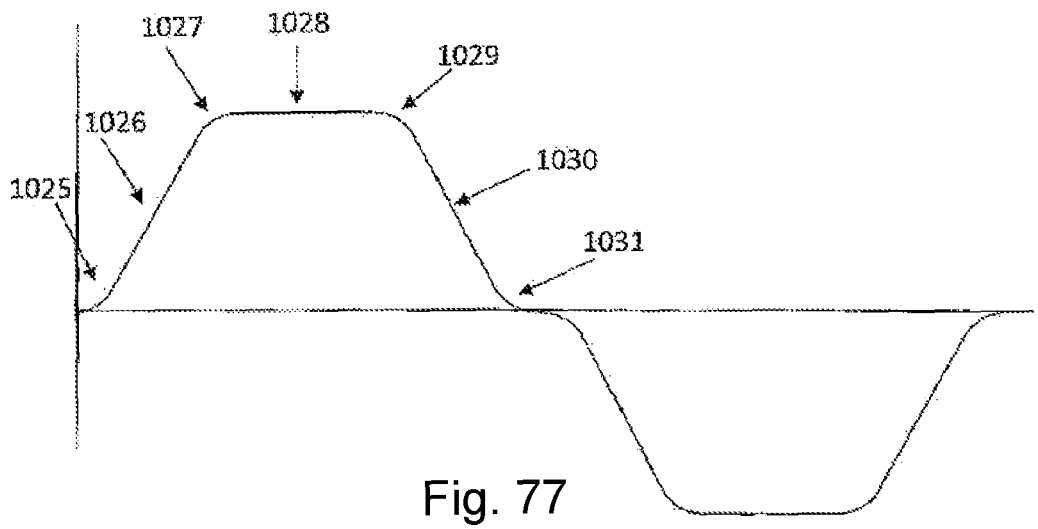
Figure 78:
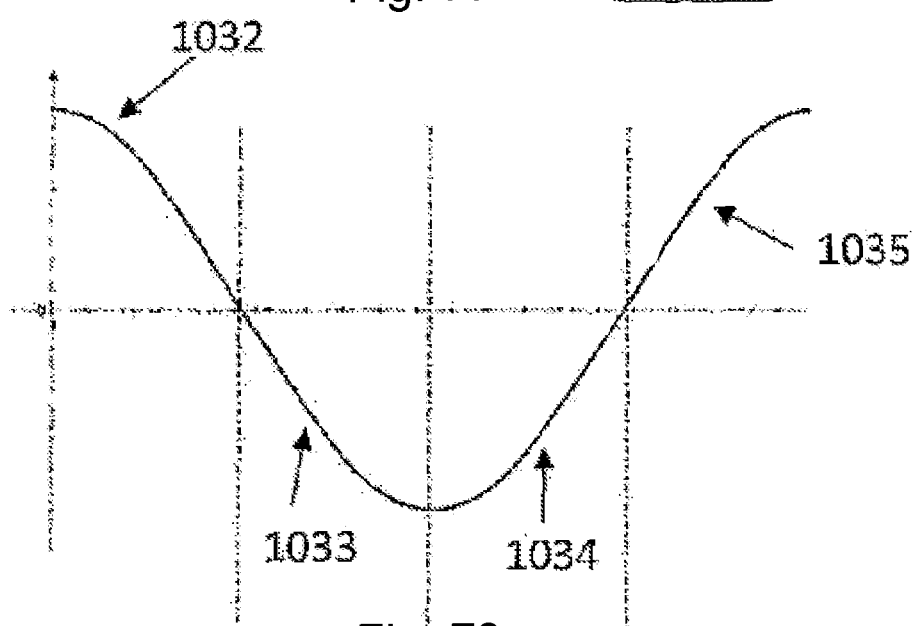
FIG. 78—Total force on the Crank pins due to the load, when two angular velocity modifier modules are used. Angular displacement of the Driving non-circular gear is on the X Axis. Total force on the Crank Pins is on the Y Axis.
Figure 79:
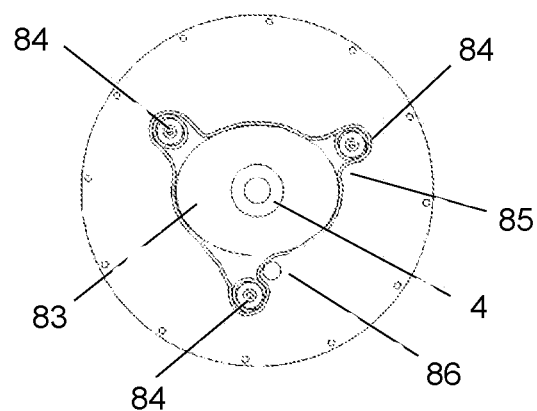
FIG. 79—Figure showing use of non-circular sprocket and chain in place of non-circular gears FIG. 80—Alternate method of changing crank pin position with crank pin axis on the rack FIG. 81—Exploded view showing differential mechanism showing component arrangement and working FIGS. 82A & 82B—Concept of using intermediate gear to eliminate multiple contacts between non-circular gears
   82A—Top View
   82B—Front View FIG. 83—Perspective View Showing Input Modification. Details showing arrangement and gear train of non-circular gears and intermediate gears from input shaft 4 to input disk 16
Figure 80:
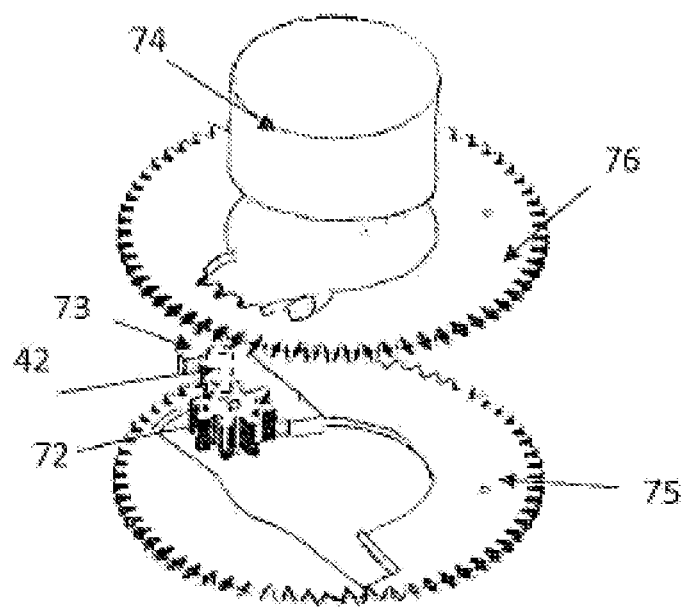
Figure 81:
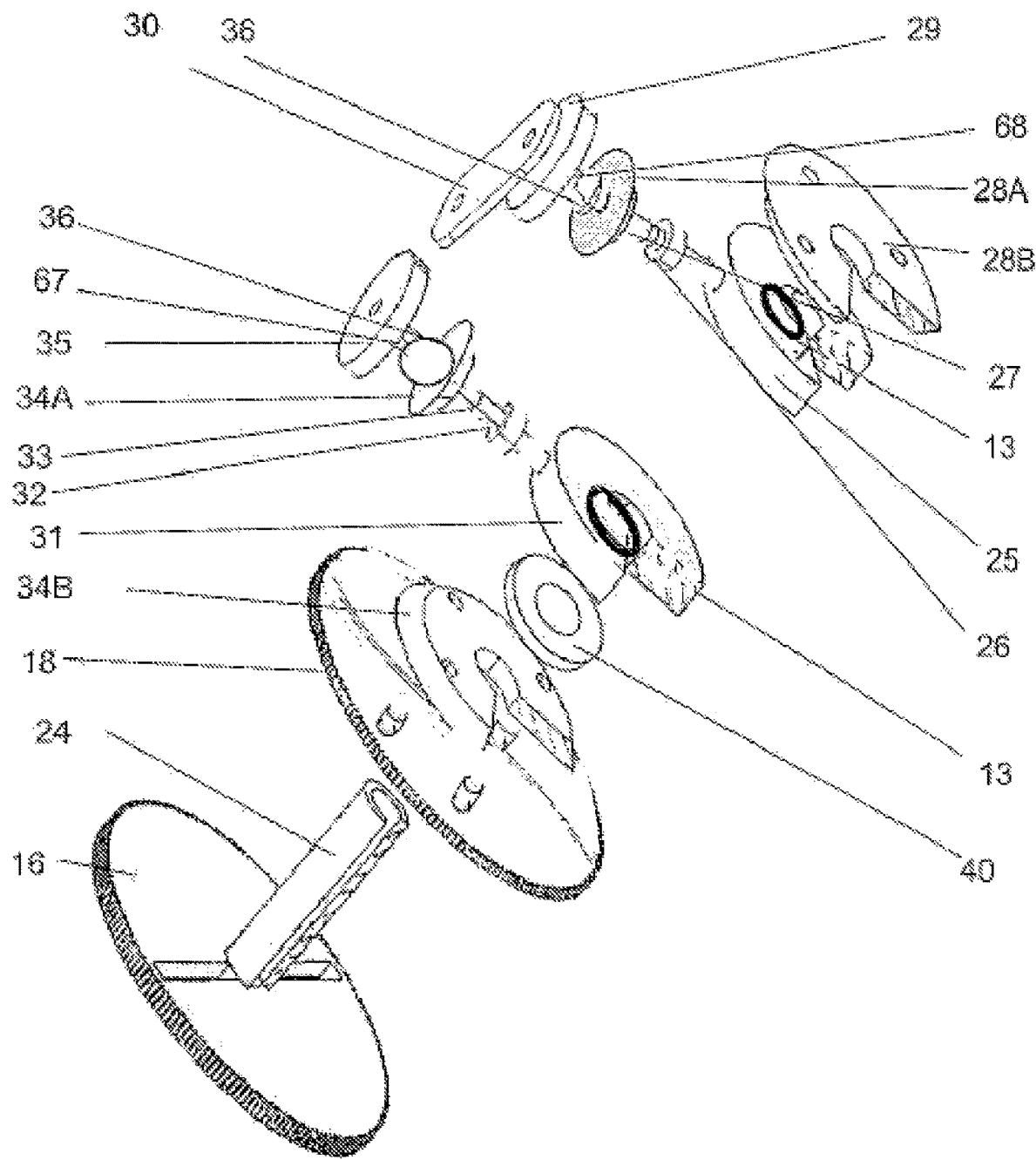
Figure 82A:
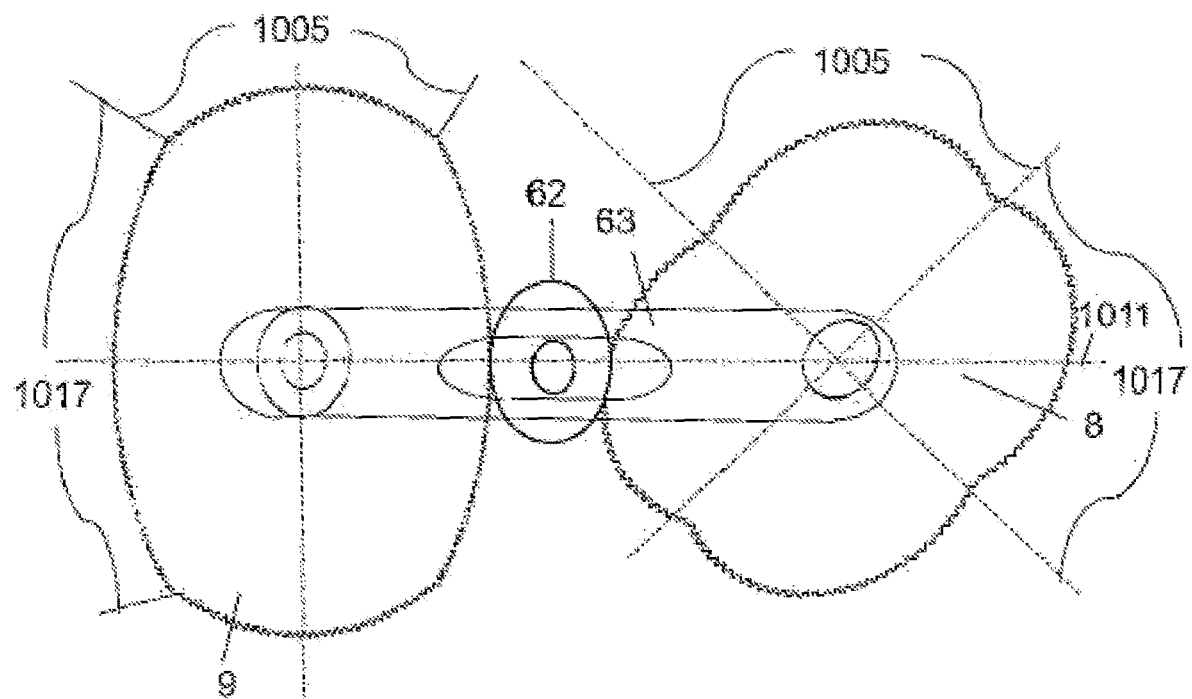
Figure 82B:
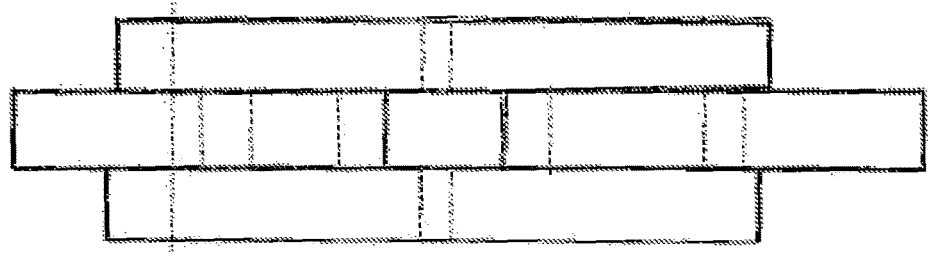
Figure 83:
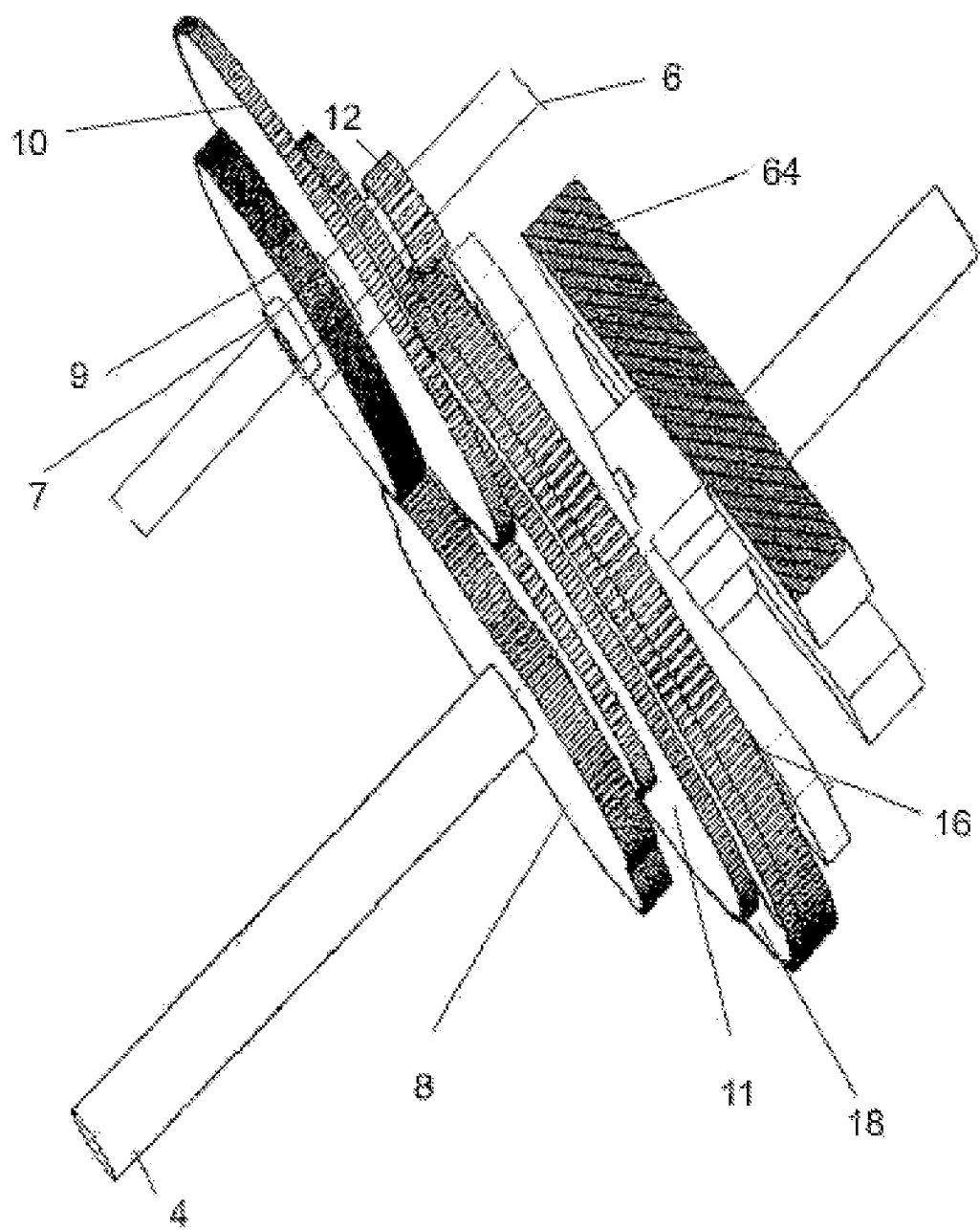
Figure 84A:
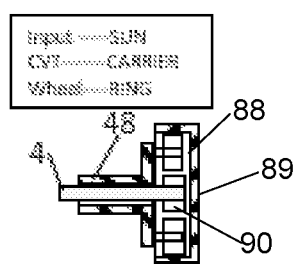
FIG. 84A-84F—Planetary gear system along with input shaft and output shaft shown with different configurations to achieve reverse gear.
Figure 84B:
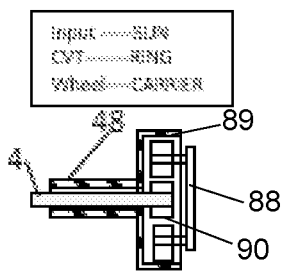
Figure 84C:
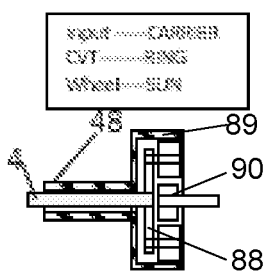
Figure 84D:
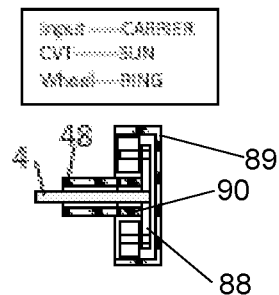
Figure 84E:
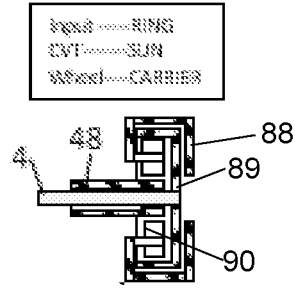
Figure 84F:
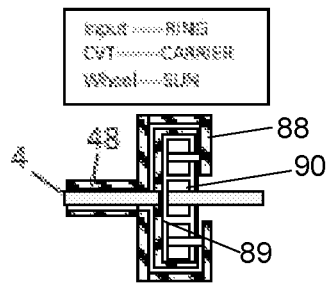

Compensating for Deviation in Rack Movement with Cams:

It is beneficial to have smooth and gradual transitions in the rack movement profile to improve the life of the transmission. As shown in FIG. 77, the ideal rack velocity profile is as follows:
  1. gradual increase in acceleration from rest 1025
  2. a region of constant acceleration 1026
  3. gradual reduction in acceleration to a constant velocity 1027
  4. a region of constant velocity 1028
  5. gradual increase in deceleration to a constant deceleration 1029
  6. a region of constant deceleration 1030
  7. gradual reduction in deceleration to zero velocity 1031
  8. steps 1 through 7 above repeated in the opposite direction It may not always be possible to generate perfect non-circular gears to meet the above desired rack 64 movement. If the pitch curves 1006 of the non-circular gears 8 & 9 do not to achieve this desired rack 64 movement, a cam spring 81 and a planetary gear system can be used to compensate for any deviations from the desired rack 64 movement profile. To achieve this, a stationary sun gear 79 with respective to the frame is placed co-axial with the driven non-circular gear 9 on a fixed shaft 88 as shown in FIGS. 75A and 75B. One or more cam shaft 82 is placed on the driven non-circular gear 9. A gear cam 77 is rigidly attached with a free to spin compensating planetary gear 87 on a carrier shaft 21 placed on the driven non-circular gear that functions as a carrier. This gear cam 77 is made to engage another input shaft cam 78 which is rigidly attached on intermediate gear shaft 6 or notched input shaft 74 or auxiliary input shaft 66 to compensate any deviation in the desired movement and avoid abrupt changes in the rack 64 velocity.

Development of Mathematical Model:

The main aim is to determine a mathematical formula for the pitch curves 1006 of the non-circular gears such that Vrack (linear velocity of the rack 64) is constant. Pitch curves 1006 are needed to develop non-circular gears.

The pitch curves for the Driving-Non-Circular-Gear 8 and Driven-Non-Circular-Gear 9, when expressed using Cartesian coordinates $(X_1, Y_E)$ and $(X_2, Y_2)$ respectively, as a function of an angle $\theta$ are, $$X_1 \text{ is substantially} = \frac{CTR * \frac{d\Phi(\theta)}{d\theta}}{1 + \frac{d\Phi(\theta)}{d\theta}} * \cos(\theta),$$

$$Y_1 \text{ is substantially} = \frac{CTR * \frac{d\Phi(\theta)}{d\theta}}{1 + \frac{d\Phi(\theta)}{d\theta}} * \sin(\theta)$$

$$X_2 \text{ is substantially} = \frac{CTR}{1 + \frac{d\Phi(\theta)}{d\theta}} * \cos(\Phi(\theta)),$$

$$Y_2 \text{ is substantially} = \frac{CTR}{1 + \frac{d\Phi(\theta)}{d\theta}} \sin(\Phi(\theta))$$

where $\Phi(\theta)$ is a solution to a piece-wise differential-equation that uses a Sine function $$N * \frac{d\Phi}{d\theta} * \sin(N * \theta) = G(\theta)$$

Where $G(\theta) =$ $$\frac{k_i * \left(\theta - \frac{2*\pi*i}{N*n}\right)}{\left(\theta_{1_i} - \frac{2*\pi*i}{N*n}\right)} \text{ if } \frac{2*\pi*i}{N*n} < \theta < \theta_{1_i}$$

$$k_i \text{ if } \theta_{1_i} < \theta < \theta_{2_i}$$

$$k_i - 2 * \frac{k_i * (\theta - \theta_{2_i})}{(\theta_{3_i} - \theta_{2_i})} \text{ if } \theta_{2_i} < \theta < \theta_{3_i}$$

$$-k_i \text{ if } \theta_{3_i} < \theta < \theta_{4_i}$$

$$-k_i + \frac{k_i * (\theta - \theta_{4_i})}{\left(\frac{2*\pi*(i+1)}{N*n} - \theta_{4_i}\right)} \text{ if } \theta_{4_i} < \theta < \frac{2*\pi*(i+1)}{N*n}$$

Where the boundary conditions are:

$$\Phi(0) = 0$$

$$\Phi(\theta_{1_i}) = \frac{\Delta + 2*\pi*i}{N}$$

$$\Phi(\theta_{2_i}) = \frac{\pi - \Delta + 2*\pi*i}{N}$$

$$\Phi(\theta_{3_i}) = \frac{\pi + \Delta + 2*\pi*i}{N}$$

$$\Phi(\theta_{4_i}) = \frac{2*\pi - \Delta + 2*\pi*i}{N}$$

-continued $$\Phi\left(\frac{\pi + 2*\pi*i}{N*n}\right) = \frac{\pi + 2*\pi*i}{N}$$

Or a differential equation using a Cosine function $$N*\frac{d\phi}{d\theta}*\cos(N*\phi) = k_i, \text{ if } \frac{i*2*\pi}{N*n} < \theta < \theta_{1_i}$$

$$k_i - 2*\frac{k_i*(\theta - \theta_{1_i})}{(\theta_{2_i} - \theta_{1_i})}, \text{ if } \theta_{1_i} < \theta < \theta_{2_i},$$

$$-k_i, \text{ if } \theta_{2_i} < \theta < \theta_{3_i},$$

$$-k_i + 2*\frac{k_i*(\theta - \theta_{3_i})}{(\theta_{4_i} - \theta_{3_i})}, \text{ if } \theta_{3_i} < \theta < \theta_{4_i},$$

$$k_i, \text{ if } \theta_{4_i} < \theta < \frac{(i+1)*2*\pi}{N*n}$$

With the boundary conditions below:

$$\Phi(0) = 0$$

$$\Phi(\theta_{1_i}) = \frac{\frac{\pi}{2} - \Delta + 2*\pi*i}{N}$$

$$\Phi(\theta_{2_i}) = \frac{\frac{\pi}{2} + \Delta + 2*\pi*i}{N}$$

$$\Phi(\theta_{3_i}) = \frac{\frac{3*\pi}{2} - \Delta + 2*\pi*i}{N}$$

$$\Phi(\theta_{4_i}) = \frac{\frac{3*\pi}{2} + \Delta + 2*\pi*i}{N}$$

$$\Phi\left(\frac{2*\pi*(i+1)}{N*n}\right) = \frac{2*\pi*(i+1)}{N}$$

Where $\theta$ is angular displacement of the Driving-Non-Circular-Gear 8

$\Phi$ is the angular position of the Driven-Non-Circular-Gear 9

$\theta_{1_i}, \theta_{2_i}, \theta_{3_i}, \theta_{4_i}$ are specific values of angular position of the Driving-Non-Circular-Gear 8 to be solved where the ranges from $\theta_{1_i}$ to $\theta_{2_i}$ and $\theta_{3_i}$ to $\theta_{4_i}$ are functional regions 1017 and $$\frac{2*\pi*i}{N*n}$$

to $\theta_{1_i}$ and $\theta_{2_i}$ to $\theta_{3_i}$ and $\theta_{4_i}$ to $$\frac{2*\pi*(i+1)}{N*n}$$

are non-functional regions $k_i$ is an unknown constant that needs to be solved for using the boundary conditions for the Input-Disk 16 ith rotation the constant of integration also needs to be solved for using boundary conditions $\Delta$ is the cutoff angle between the first functional and non-functional regions N is the number of times the Input-Disk 16 rotates when the Driven-Non-Circular-Gear 9 rotates once n is the number of times the Driven-Non-Circular-Gear 9 rotates when the Driving-Non-Circular-Gear 8 rotates once i refers to the ith rotation of the Input-Disk 16 starting with i=0 and going up to i=N*n−1

In our simple design, the following parameters were used: N=2, n=2. So using the Sine function $$2*\frac{d\Phi}{d\theta}*\sin(2*\theta) = G(\theta)$$

Where $G(\theta) = \frac{k_0*(\theta)}{(\theta_{1_0})}$ if $0 < \theta < \theta_{1_0}$ $k_0$ if $\theta_{1_0} < \theta < \theta_{2_0}$ $k_0 - 2*\frac{k_0*(\theta - \theta_{2_0})}{(\theta_{3_0} - \theta_{2_0})}$ if $\theta_{2_0} < \theta < \theta_{3_0}$ $-k_0$ if $\theta_{3_0} < \theta < \theta_{4_0}$ $-k_0 + \frac{k_0*(\theta - \theta_{4_0})}{\left(\frac{2*\pi}{4} - \theta_{4_0}\right)}$ if $\theta_{4_0} < \theta < \frac{2*\pi}{4}$ $\frac{k_1*\left(\theta - \frac{2*\pi}{4}\right)}{\left(\theta_{1_1} - \frac{2*\pi}{4}\right)}$ if $\frac{2*\pi}{4} < \theta < \theta_{1_1}$ $k_1$ if $\theta_{1_1} < \theta < \theta_{2_1}$ $k_1 - 2*\frac{k_1*(\theta - \theta_{2_1})}{(\theta_{3_1} - \theta_{2_1})}$ if $\theta_{2_1} < \theta < \theta_{3_1}$ $-k_1$ if $\theta_{3_1} < \theta < \theta_{4_1}$ $-k_1 + \frac{k_1*(\theta - \theta_{4_1})}{\left(\frac{4*\pi}{4} - \theta_{4_1}\right)}$ if $\theta_{4_1} < \theta < \frac{4*\pi}{4}$ $\frac{k_2*\left(\theta - \frac{4*\pi}{4}\right)}{\left(\theta_{1_2} - \frac{4*\pi}{4}\right)}$ if $\frac{4*\pi}{4} < \theta < \theta_{1_2}$ $k_2$ if $\theta_{1_2} < \theta < \theta_{2_2}$ $k_2 - 2*\frac{k_2*(\theta - \theta_{2_2})}{(\theta_{3_2} - \theta_{2_2})}$ if $\theta_{2_2} < \theta < \theta_{3_2}$ $-k_2$ if $\theta_{3_2} < \theta < \theta_{4_2}$ $-k_2 + \frac{k_2*(\theta - \theta_{4_2})}{\left(\frac{6*\pi}{4} - \theta_{4_2}\right)}$ if $\theta_{4_2} < \theta < \frac{6*\pi}{4}$ $\frac{k_3*\left(\theta - \frac{6*\pi}{4}\right)}{\left(\theta_{1_3} - \frac{6*\pi}{4}\right)}$ if $\frac{6*\pi}{4} < \theta < \theta_{1_3}$ $k_3$ if $\theta_{1_3} < \theta < \theta_{2_3}$ $k_3 - 2*\frac{k_3*(\theta - \theta_{2_3})}{(\theta_{3_3} - \theta_{2_3})}$ if $\theta_{2_3} < \theta < \theta_{3_3}$ $-k_3$ if $\theta_{3_3} < \theta < \theta_{4_3}$ $-k_3 + \frac{k_3*(\theta - \theta_{4_3})}{\left(\frac{8*\pi}{4} - \theta_{4_3}\right)}$ if $\theta_{4_3} < \theta < \frac{8*\pi}{4}$ And the boundary conditions are:

$$\Phi(0) = 0$$

$$\Phi(\theta_{1_0}) = \frac{\Delta}{2}$$

$$\Phi(\theta_{2_0}) = \frac{\pi - \Delta}{2}$$

$$\Phi(\theta_{3_0}) = \frac{\pi + \Delta}{2}$$

$$\Phi(\theta_{4_0}) = \frac{2*\pi - \Delta}{2}$$

$$\Phi\left(\frac{\pi}{4}\right) = \frac{\pi}{2}$$

$$\Phi(\theta_{1_1}) = \frac{\Delta + 2*\pi}{2}$$

$$\Phi(\theta_{2_1}) = \frac{\pi - \Delta + 2*\pi}{2}$$

$$\Phi(\theta_{3_1}) = \frac{\pi + \Delta + 2*\pi}{2}$$

$$\Phi(\theta_{4_1}) = \frac{2*\pi - \Delta + 2*\pi}{2}$$

$$\Phi\left(\frac{3*\pi}{4}\right) = \frac{3*\pi}{2}$$

$$\Phi(\theta_{1_2}) = \frac{\Delta + 4*\pi}{2}$$

$$\Phi(\theta_{2_2}) = \frac{\pi - \Delta + 4*\pi}{2}$$

$$\Phi(\theta_{3_2}) = \frac{\pi + \Delta + 4*\pi}{2}$$

$$\Phi(\theta_{4_2}) = \frac{2*\pi - \Delta + 4*\pi}{2}$$

$$\Phi\left(\frac{5*\pi}{4}\right) = \frac{5*\pi}{2}$$

$$\Phi(\theta_{1_3}) = \frac{\Delta + 6*\pi}{2}$$

$$\Phi(\theta_{2_3}) = \frac{\pi - \Delta + 6*\pi}{2}$$

$$\Phi(\theta_{3_3}) = \frac{\pi + \Delta + 6*\pi}{2}$$

$$\Phi(\theta_{4_3}) = \frac{2*\pi - \Delta + 6*\pi}{2}$$

$$\Phi\left(\frac{7*\pi}{4}\right) = \frac{7*\pi}{2}$$

Using the Cosine function we get $$2*\frac{d\phi}{d\theta}*\cos(2*\phi) = k_0, \text{ if } 0 < \theta < \theta_{1_0}$$

$$k_0 - 2*\frac{k_0*(\theta - \theta_{1_0})}{(\theta_{2_0} - \theta_{1_0})}, \text{ if } \theta_{1_0} < \theta < \theta_{2_0},$$

$$-k_0, \text{ if } \theta_{2_0} < \theta < \theta_{3_0},$$

$$-k_0 + 2*\frac{k_0*(\theta - \theta_{3_0})}{(\theta_{4_0} - \theta_{3_0})}, \text{ if } \theta_{3_0} < \theta < \theta_{4_0},$$

$$k_0, \text{ if } \theta_{4_0} < \theta < \frac{2*\pi}{4}$$

$$k_1, \text{ if } \frac{2*\pi}{4} < \theta < \theta_{1_1}$$

$$k_1 - 2*\frac{k_1*(\theta - \theta_{1_1})}{(\theta_{2_1} - \theta_{1_1})}, \text{ if } \theta_{1_1} < \theta < \theta_{2_1},$$

-continued $$-k_1, \text{ if } \theta_{2_1} < \theta < \theta_{3_1},$$

$$-k_1 + 2*\frac{k_1*(\theta - \theta_{3_1})}{(\theta_{4_1} - \theta_{3_1})}, \text{ if } \theta_{3_1} < \theta < \theta_{4_1},$$

$$k_1, \text{ if } \theta_{4_1} < \theta < \frac{4*\pi}{4}$$

$$k_2, \text{ if } \frac{4*\pi}{4} < \theta < \theta_{1_2}$$

$$k_2 - 2*\frac{k_2*(\theta - \theta_{1_2})}{(\theta_{2_2} - \theta_{1_2})}, \text{ if } \theta_{1_2} < \theta < \theta_{2_2},$$

$$-k_2, \text{ if } \theta_{2_2} < \theta < \theta_{3_2},$$

$$-k_2 + 2*\frac{k_2*(\theta - \theta_{3_2})}{(\theta_{4_2} - \theta_{3_2})}, \text{ if } \theta_{3_2} < \theta < \theta_{4_2},$$

$$k_2, \text{ if } \theta_{4_2} < \theta < \frac{6*\pi}{4}$$

$$k_3, \text{ if } \frac{6*\pi}{4} < \theta < \theta_{1_3}$$

$$k_3 - 2*\frac{k_3*(\theta - \theta_{1_3})}{(\theta_{2_3} - \theta_{1_3})}, \text{ if } \theta_{1_3} < \theta < \theta_{2_3},$$

$$-k_3, \text{ if } \theta_{2_3} < \theta < \theta_{3_3},$$

$$-k_3 + 2*\frac{k_3*(\theta - \theta_{3_3})}{(\theta_{4_3} - \theta_{3_3})}, \text{ if } \theta_{3_3} < \theta < \theta_{4_3},$$

$$k_3, \text{ if } \theta_{4_3} < \theta < \frac{8*\pi}{4}$$

Where the boundary conditions are:

$$\Phi(0) = 0$$

$$\Phi(\theta_{1_0}) = \frac{\frac{\pi}{2} - \Delta}{2}$$

$$\Phi(\theta_{2_0}) = \frac{\frac{\pi}{2} + \Delta}{2}$$

$$\Phi(\theta_{3_0}) = \frac{\frac{3*\pi}{2} - \Delta}{2}$$

$$\Phi(\theta_{4_0}) = \frac{\frac{3*\pi}{2} + \Delta}{2}$$

$$\Phi\left(\frac{2*\pi}{4}\right) = \frac{2*\pi}{2}$$

$$\Phi(\theta_{1_1}) = \frac{\frac{\pi}{2} - \Delta + 2*\pi}{2}$$

$$\Phi(\theta_{2_1}) = \frac{\frac{\pi}{2} + \Delta + 2*\pi}{2}$$

$$\Phi(\theta_{3_1}) = \frac{\frac{3*\pi}{2} - \Delta + 2*\pi}{2}$$

$$\Phi(\theta_{4_1}) = \frac{\frac{3*\pi}{2} + \Delta + 2*\pi}{2}$$

$$\Phi\left(\frac{4*\pi}{4}\right) = \frac{4*\pi}{2}$$

-continued $$\Phi(\theta_{1_2}) = \frac{\frac{\pi}{2} - \Delta + 4*\pi}{2}$$

$$\Phi(\theta_{2_2}) = \frac{\frac{\pi}{2} + \Delta + 4*\pi}{2}$$

$$\Phi(\theta_{3_2}) = \frac{\frac{3*\pi}{2} - \Delta + 4*\pi}{2}$$

$$\Phi(\theta_{4_2}) = \frac{\frac{3*\pi}{2} + \Delta + 4*\pi}{2}$$

$$\Phi\left(\frac{6*\pi}{4}\right) = \frac{6*\pi}{2}$$

$$\Phi(\theta_{1_3}) = \frac{\frac{\pi}{2} - \Delta + 6*\pi}{2}$$

$$\Phi(\theta_{2_3}) = \frac{\frac{\pi}{2} + \Delta + 6*\pi}{2}$$

$$\Phi(\theta_{3_3}) = \frac{\frac{3*\pi}{2} - \Delta + 6*\pi}{2}$$

$$\Phi(\theta_{4_3}) = \frac{\frac{3*\pi}{2} + \Delta + 6*\pi}{2}$$

$$\Phi\left(\frac{8*\pi}{4}\right) = \frac{8*\pi}{2}$$

In the most general form, $\Phi(\theta)$ is a solution to a piece-wise differential-equation $$N * \frac{d\phi}{d\theta} * \sin(N*\phi) =$$

function of any linear or nonlinear curve connecting the points $$\left(\frac{i*2*\pi}{N*n}, 0\right)$$

to $(\theta_{1_i}, k_i)$ if $\frac{i*2*\pi}{N*n} < \theta < \theta_{1_i}$, $k_i$ if $\theta_{1_i} < \theta < \theta_{2_i}$, function of any linear or nonlinear curve connecting the points $(\theta_{2_i}, k_i)$ to $(\theta_{3_i}, -k_i)$
if $\theta_{2_i} < \theta < \theta_{3_i}$,
$-k_i$ if $\theta_{3_i} < \theta < \theta_{4_i}$,
function of any linear or nonlinear curve connecting the points $(\theta_{4_i}, -k_i)$ to $$\left(\frac{(i+1)*2*\pi}{N*n}, 0\right) \text{ if } \theta_{4_i} < \theta < \frac{(i+1)*2*\pi}{N*n},$$

OR $$N * \frac{d\phi}{d\theta} * \cos(N*\phi) = k_i \text{ if } \frac{i*2*\pi}{N*n} < \theta < \theta_{1_i},$$

function of any linear or nonlinear curve connecting the points $(\theta_{1_i}, k_i)$ to $(\theta_{2_i}, -k_i)$
if $\theta_{1_i} < \theta < \theta_{2_i}$,
$-k_i$, if $\theta_{2_i} < \theta < \theta_{3_i}$,
function of any linear or nonlinear curve connecting the points $(\theta_{3_i}, -k_i)$ to $(\theta_{4_i}, k_i)$, if $\theta_{3_i} < \theta < \theta_{4_i}$, $k_i$, if $\theta_{4_i} < \theta < \frac{(i+1)*2*\pi}{N*n}$, Where the boundary conditions are $$\Phi(0) = 0$$

$$\Phi\left(\frac{(i+1)*2*\pi}{N*n}\right) = \frac{(i+1)*2*\pi}{N}$$

$$\Phi(\theta_{1_i}) = \frac{i*2*\pi}{N} + \Phi_1$$

$$\Phi(\theta_{2_i}) = \frac{i*2*\pi}{N} + \Phi_2$$

$$\Phi(\theta_{3_i}) = \frac{i*2*\pi}{N} + \Phi_3$$

$$\Phi(\theta_{4_i}) = \frac{i*2*\pi}{N} + \Phi_4$$

Where $\theta$ is the angular displacement of the Driving-Non-Circular-Gear $\Phi$ is the angular displacement of the Driven-Non-Circular-Gear i refers to the i-th revolution the Input-Disk from 0 to $N*n-1$ with the $1^{st}$ rotation being i=0;

N is the number of times the Input-Disk spins when the Driven-Non-Circular-Gear spins once; The value of N will depend on the radii of the intermediate circular gears.

n is the number of times the Driven-Non-Circular-Gear spins when the Driving-Non-Circular-Gear spins once;

the regions where the piece-wise function is constant are functional regions and the regions where the piece-wise function is not constant are non-functional regions which can be linear or non-linear functions of $\theta$;

$\theta_{1_i}$, $\theta_{2_i}$, $\theta_{3_i}$ and $\theta_{4_i}$ are specific angular positions of the Driving-Non-Circular-Gear, the values of which need to be solved for using the solution to the differential equation;

$\Phi_1$, $\Phi_2$, $\Phi_3$ and $\Phi_4$ are specific angular positions of the Driven-Non-Circular-Gear corresponding to angular positions $\theta_{1_i}$, $\theta_{2_i}$, $\theta_{3_i}$ and $\theta_{4_i}$ of the Driving-Non-Circular-Gear respectively, and are the cutoff between functional and non-functional regions the values of which need to be chosen;

$k_i$ $_{are}$ constants which needs to be solved for, however would be all equal;

Where "i" refers to the ith rotation of the Input-Disk 16 with the $1^{st}$ rotation being i=0

The piece-wise function can be set up for a 1 whole cycle of the rack movement function or multiple cycles, or part of a cycle (only if using symmetric rack movement function). Reflection techniques can be used to get the complete pitch curve for the driving and driven non-circular gears.

$t_{n+1_j}$ can be related to $t_{n_j}$ using symmetry conditions or treated as unrelated to each other using another set of boundary conditions $t_{n+1_j}$ can be related to $t_{n_j}$ using cycle period equation or treated as unrelated to each other using another set of boundary conditions.

The same constant k can be used all the way through or treated as different in each term and solved for using appropriate boundary conditions, however they would all have the same values.

Appproprte remaining boundary conditions can be chosen to solve for the remaining unknown variables.

The pitch-curves of the Driving-Non-Circular-Gear and the Driven-Non-Circular-Gear have maximal and minimal values for the radius and multiple parts which can be derived from each other by successive mirroring about appropriate planes. This is shown in FIGS. 89 and 90 where the four parts 1007 of each of the Non-Circular-Gears can be derived by mirroring each other.

Compensating for Force Required to Move the Crank Pin to Change Input to Output Ratio:

It will take a large amount of force to be applied on the Lever-Ratio-Changing-Planetary-mechanism 23 to move the Crank-Pin 42 since it is opposing the load from the output. This force is dependent on the torque required to overcome the load on the output by the Input-Disk 16, the angle of the input slot to the direction of Rack 64 movement and the distance of the Crank-Pin 42 to axis of rotation of the Input-Disk 16. The direction and magnitude of this force changes as shown in the graph in FIG. 98, as an example, when two Angular-Velocity-Modifier-Modules are used.

Here, the force acting on one Angular-Velocity-Modifier-Module is $R_f \cos(\Phi_a(\theta))$ and the other Angular-Velocity-Modifier-Module is $R_f \sin(\Phi_b(\theta))$ and the sum is $$R_f \cos(\Phi_a(\theta)) + R_f \sin(\Phi_a(\theta)),$$

where $R_f$ is the force experienced by the Rack 64 of the respective module at any given time.

$(\Phi_a(\theta))$ and $(\Phi_b(\theta))$ are angles of rotation ($\Phi$) of the two Driven-Non-Circular-Gears 9 which are functions of the rotation of the Driving-Non-Circular-Gear ($\theta$). A graph showing this force as a function of the angular displacement of the Driving-Non-Circular-Gear 8 is shown in FIG. 98. The portions of the graph 1032 and 1033, show the magnitude and direction of the force exerted by the rack connected to the first Angular-Velocity-Modifier-Module. The portions of the graph 1034 and 1035, show the magnitude and direction of the force exerted by the rack connected to the second Angular-Velocity-Modifier-Module. A pair of Spring-Force-Compensation 80 can be used to assist in overcoming this force for each Angular-Velocity-Modifier-Module.

The two Spring-Force-Compensation 80 are individually attached to the operating Lever-Ratio-Changing-Planetary-Mechanism 23 acting on the Cam-Input-Shaft 78 (as shown in FIG. 96) will exert force in the opposite direction of the load from the output.

Springs with a spring constant that it close to the average value of the force required when the Crank-Pin 42 is at its two extreme positions, over the distance of the two extreme position can be chosen.

The invention claimed is:

1. An Infinitely variable transmission, comprising: one or more driving non-circular gears mounted on an input shaft, each of the one or more driving non-circular gears is operably connected to one or more driven non-circular gears, wherein each of the one or more driven non-circular gears is operably connected to rotate an input disk of a scotch yoke mechanism, each scotch yoke mechanism revolves a crank pin around an axis of rotation of the respective input disk, wherein each crank pin is placed at an offset distance to the axis of rotation of the respective input disk, the offset distance of each crank pin can be altered simultaneously from 0 to a real value by an external force applied to a lever which is operatively connected to each crank pin, wherein each crank pin reciprocates one or more racks which are restricted to only move along pitch lines of the respective one or more racks, wherein each of the one or more racks is engaged with and rotates a pinion, wherein each pinion comprises a one way bearing and is mounted on a hollow output shaft, wherein the hollow output shaft is co-axially placed with the input shaft, and the input shaft passes completely through the output shaft.

2. An infinitely variable transmission, comprising: one or more driving sprockets mounted on an input shaft, each of the one or more driving sprockets is operably connected via a chain to one or more idler sprockets and to one or more driven sprockets, wherein at least one of the driving or driven sprockets is non-circular, each of the one or more driven sprockets is operably connected to rotate an input disk of a scotch yoke mechanism, each scotch yoke mechanism revolves a crank pin around an axis of rotation of the respective input disk, wherein each crank pin is placed at an offset distance to the axis of rotation of the respective input disk, the offset distance of each crank pin can be altered simultaneously from 0 to a real value by an external force applied to a lever which is operatively connected to each crank pin, wherein each crank pin reciprocates one or more racks which are restricted to only move along pitch lines of the respective one or more racks, wherein each of the one or more racks is engaged with and rotates a pinion, wherein each pinion comprises a one way bearing and is mounted on a hollow output shaft, wherein the hollow output shaft is co-axially placed with the input shaft, and the input shaft passes completely through the output shaft.

3. An infinitely variable transmission, comprising:
   one or more scotch yoke modules, wherein each scotch yoke module comprises: a crank pin which revolves around a notched auxiliary input shaft, wherein the crank pin is at an offset distance between a longitudinal axis of the crank pin and the auxiliary input shaft that remain parallel to each other, the offset distance can be altered from zero, when the crank pin is co-axial with the auxiliary input shaft, to a non-zero real number by displacing the crank pin along a radial slot, wherein the radial slot is formed in an input disk, wherein the input disk is rigidly mounted on the notched auxiliary input shaft by a crank pin displacement mechanism, wherein the crank pin displacement mechanism comprises: a sliding collar disposed co-axially with the auxiliary input shaft, a mechanism which causes a relative axial translation of the sliding collar with respect to the auxiliary input shaft, wherein the relative axial translations causes a radial displacement of the crank pin;
   a common disk, which enables simultaneous axial translation of each sliding collar of the one or more scotch yoke modules;
   a slotted rack holder for each of the one or more scotch yoke modules, the slotted rack holder comprising: one or more racks, which are restricted to only move along a direction of a longitudinal axis of the one or more racks, and a crank pin slot for receiving a respective crank pin of the one or more scotch yoke modules, with the longitudinal axis of the crank pin slot being orthogonal to the one or more racks;

an input shaft which completely passes through a common hollow pinion shaft;

one or more angular velocity modules, each angular velocity module comprising: one or more driving non-circular gears mounted on the input shaft, each of the one or more driving non-circular gears driving one or more driven non-circular gears, wherein each of the one or more driven non-circular gears are mounted on a respective auxiliary input shaft of the one or more scotch yoke modules, wherein the one or more driven non-circular gears function as a carrier of a planetary gear system, the planetary gear system comprising one or more carrier shafts, each carrier shaft having a free to spin planetary gear operationally engaged with a stationary sun gear, a primary cam that is axially attached to each planetary gear and operably engages with a secondary cam that is axially attached to the respective auxiliary input shaft of the one or more scotch yoke modules;

a rectifier module for each of the one or more racks comprising: a pinion engaged with a respective rack, and each pinion is mounted on the common hollow pinion shaft through a computer-controlled clutch, a one-way bearing or a ratchet mechanism;

wherein the one or more angular velocity modules are arranged such that a uniform rotation of each of the one or more driving non-circular gears via the input shaft, causes a non-uniform angular velocity of the one or more driven non-circular gears, wherein the non-uniform angular velocity causes a respective planetary gear meshing with a respective stationary sun gear to revolve around a longitudinal axis of a respective driven non-circular gear while rotating along with a respective primary cam and exerting a tangential force on a respective secondary cam causing the respective secondary cam to rotate along with a respective auxiliary input shaft, rotation of the respective auxiliary input shaft causes a respective crank pin to reciprocate respective one or more racks substantially along the longitudinal axis of the respective one or more racks at a substantially constant velocity and slowing down briefly during direction reversal and accelerating to the substantially constant velocity, wherein a magnitude of the reciprocation is proportional to the offset distance of the respective crank pin and the respective auxiliary input shaft of each of the one or more scotch yoke mechanisms, and the reciprocation of the respective one or more racks causes an alternating rotation of a respective pinion and the alternating rotation of the respective pinion is converted to a unidirectional rotation of the common hollow pinion shaft via the computer-controlled clutch, the one-way bearing or the ratchet mechanism.

4. The infinitely variable transmission of claim 3, wherein the auxiliary input shaft of the one or more scotch yoke mechanisms has a non-circular cross section, and the sliding collar of the one or more scotch yoke mechanisms has a non-circular orifice matching the non-circular cross section.

5. The continuously variable transmission of claim 3, further comprising a dummy rack, a dead weight and a wheel for each of the one or more racks, wherein the dummy rack has a substantially similar mass and is oriented 180 degrees relative to a respective one of the one or more racks; wherein the dead weight and the wheel transfer motion from the respective one of the one or more racks to the dummy rack, and the dummy rack moves in a substantially opposite direction of the respective one of the one or more racks, wherein the movement cancels vibration due to an oscillatory motion of the slotted rack holder for each of the one or more scotch yoke modules.

6. The continuously variable transmission of claim 3, wherein the one or more scotch yoke modules further comprises a dummy crank pin having a mass substantially identical to a mass of the crank pin and slides in an opposite direction of the crank pin.

7. The continuously variable transmission of claim 3, further comprising: a differential assembly comprising an input miter bevel gear and a pair of substantially co-axial output miter bevel gears operably connected with the input miter bevel gear such that the output miter bevel gears rotate in opposite directions, each output miter bevel gear having a through-bore substantially at a central axis thereof and are substantially co-axial with each other; a through-shaft positioned through the through-bores of the output miter bevel gears; and a pair of collars operably coupled with the through-shaft and rotatably fixed therewith, each collar configured to move axially along the through-shaft independently of the other collar and configured to engage with one of the output miter bevel gears; wherein the hollow pinion shaft is operably coupled with the input miter bevel gear to rotate the input miter bevel gear.

8. A The continuously variable transmission of claim 7, wherein: when a first one of the collars is engaged with a first one of the output miter bevel gears and a second one of the collars is not engaged with a second one of the output miter bevel gears, the through-shaft rotates about its longitudinal axis in a first direction corresponding to a rotational direction of the first one of the output miter bevel gears; and when the second one of the collars is engaged with the second one of the output miter bevel gears and the first one of the collars is not engaged with the first one of the output miter bevel gears, the through-shaft rotates about its longitudinal axis in a second direction corresponding to a rotational direction of the second one of the output miter bevel gears.

9. The continuously variable transmission of claim 7, wherein when neither of the collars is engaged with the output miter bevel gears, the through-shaft is free to rotate in any direction about its longitudinal axis.

10. The continuously variable transmission of claim 7, when each of the collars is engaged with a respective one of the output miter bevel gears, the through-shaft is restricted from rotating about its longitudinal axis.

11. The continuously variable transmission of claim 3, wherein the input shaft is connected to a ring gear, a carrier or a sun gear, an output from the hollow pinion shaft is connected to another one of the ring gear, the carrier or the sun gear and a final output is connected to another one of the ring gear, the carrier, or the sun gear.

* * * * *